(12) United States Patent
Sajjadi et al.

(10) Patent No.: US 11,162,895 B2
(45) Date of Patent: Nov. 2, 2021

(54) SYSTEMS AND METHODS FOR CHARACTERIZING BIOLOGICAL MATERIAL USING NEAR-INFRARED SPECTROSCOPY

(71) Applicant: The General Hospital Corporation, Boston, MA (US)

(72) Inventors: Amir Y. Sajjadi, Charlestown, MA (US); Stefan A. Carp, Charlestown, MA (US); Dieter Manstein, Charlestown, MA (US)

(73) Assignee: The General Hospital Corporation, Boston, MA (US)

( * ) Notice: Subject to any disclaimer, the term of this patent is extended or adjusted under 35 U.S.C. 154(b) by 0 days.

(21) Appl. No.: 17/090,465

(22) Filed: Nov. 5, 2020

(65) Prior Publication Data
US 2021/0123860 A1 Apr. 29, 2021

Related U.S. Application Data

(63) Continuation of application No. 16/332,243, filed as application No. PCT/US2017/051266 on Sep. 13, 2017, now abandoned.
(Continued)

(51) Int. Cl.
*G01N 21/359* (2014.01)
*G01N 21/47* (2006.01)

(52) U.S. Cl.
CPC ......... *G01N 21/359* (2013.01); *G01N 21/474* (2013.01); *G01N 21/4795* (2013.01); *G01N 2021/4742* (2013.01); *G01N 2201/12* (2013.01)

(58) Field of Classification Search
CPC ............ G01N 21/359; G01N 2201/12; G01N 21/4795; G01N 2021/4742; G01N 21/474
See application file for complete search history.

(56) References Cited

U.S. PATENT DOCUMENTS

| 5,369,496 A | 11/1994 | Alfano |
| 7,729,749 B2 * | 6/2010 | Roessler ............. A61B 5/0059 600/476 |

(Continued)

FOREIGN PATENT DOCUMENTS

WO 2001092293 12/2001

OTHER PUBLICATIONS

Bernstein, E. F., et al. Non-invasive fat reduction of the flanks using a new cryolipolysis applicator and overlapping, two-cycle treatments. Lasers in Surgery and Medicine 46, 731-735, doi:10.1002/lsm.22302 (2014).
(Continued)

*Primary Examiner* — David P Porta
*Assistant Examiner* — Fani Boosalis
(74) *Attorney, Agent, or Firm* — Quarles & Brady LLP

(57) ABSTRACT

The present disclosure provides systems and methods for characterizing and monitoring biological material. In one aspect, a method for characterizing biological material includes acquiring optical data associated with a biological material, and analyzing the optical data to determine optical properties of the biological tissue. The method also includes determining, using the optical properties, phase information corresponding to the biological material, and generating a report characterizing the biological tissue using at least the phase information.

22 Claims, 21 Drawing Sheets

Related U.S. Application Data

(60) Provisional application No. 62/393,743, filed on Sep. 13, 2016.

(56) References Cited

U.S. PATENT DOCUMENTS

| | | |
|---|---|---|
| 8,064,063 B2 | 11/2011 | Naessens |
| 2002/0169379 A1 | 11/2002 | Camacho |
| 2012/0010603 A1 | 1/2012 | Milner |

OTHER PUBLICATIONS

Boey, G.E. et al, Enhanced clinical outcome with manual massage following cryolipolysis treatment: a 4-month study of safety and efficacy. Lasers Surg Med, 2014. 46(1): p. 20-26.

Carp, S.A., et al., Compression-induced changes in the physiological state of the breast as observed through frequency domain photon migration measurements. Journal of Biomedical Optics, 2006. 11(6): p. 064016-064016-6.

Carp, S.A., et al., Hemodynamic signature of breast cancer under fractional mammographic compression using a dynamic diffuse optical tomography system. Biomedical Optics Express, 2013. 4(12): p. 2911-2924.

Fay, H. et al. Polymorphism of natural fatty acid liquid crystalline phases. Langmuir 28, 272-282, doi:10.1021/la203841y (2012).

Guendouzi, A. et al. Prediction of the melting points of fatty acids from computed molecular descriptors: a quantitative structure-property relationship study. Chem Phys Lipids 165, 1-6, doi:10.1016/j.chemphyslip.2011.10.001 (2012).

Ingargiola, M.J., et al., Cryolipolysis for Fat Reduction and Body Contouring: Safety and Efficacy of Current Treatment Paradigms. Plast Reconstr Surg, 2015. 135(6): p. 1581-1590.

International Searching Authority. International Search Report and Written Opinion for application PCT/US2017/051266, dated Nov. 20, 2017.

Kilmer, S. L., et al. Safety and efficacy of cryolipolysis for non-invasive reduction of submental fat. Lasers in Surgery and Medicine 48, 3-13, doi:10.1002/lsm.22440 (2016).

Klein, K. B. et al. Non-invasive cryolipolysis for subcutaneous fat reduction does not affect serum lipid levels or liver function tests. Lasers Surg Med 41, 785-790, doi:10.1002/lsm.20850 (2009).

Manstein, D., et al., Selective cryolysis: a novel method of non-invasive fat removal. Lasers Surg Med, 2008. 40(9): p. 595-604.

Pinto, H., et al. Evaluation of adipocytic changes after a simil-lipocryolysis stimulus. Cryo Letters 34, 100-105 (2013).

Reeder, S. B., et al. Quantitative Assessment of Liver Fat with Magnetic Resonance Imaging and Spectroscopy. J Magn Reson Imaging 34, spcone, doi:10.1002/jmri.22775 (2011).

Sato, K. and S. Ueno, Polymorphism in Fats and Oils. vol. 1 chapter 3 in Baileys Industrial Oil and Fat Products. 2005, John Wiley & Sons, Inc.

Shek, S.Y., et al, Non-invasive cryolipolysis for body contouring in Chinese—a first commercial experience. Lasers Surg Med, 2012. 44(2): p. 125-130.

Stevens, W. G. et al. Cryolipolysis Conformable-Surface Applicator for Nonsurgical Fat Reduction in Lateral Thighs. Aesthetic Surgery Journal 35, 66-71, doi:10.1093/asj/sju024 (2015).

Stevens, W. G. et al. Broad Overview of a Clinical and Commercial Experience With CoolSculpting. Aesthetic Surgery Journal 33, 835-846, doi:10.1177/1090820x13494757 (2013).

Wanitphakdeedecha, R., et al. The efficacy of cryolipolysis treatment on arms and inner thighs. Lasers in Medical Science 30, 2165-2169, doi:10.1007/s10103-015-1781-y (2015).

Zelickson, B. et al. Cryolipolysis for noninvasive fat cell destruction: initial results from a pig model. Dermatol Surg 35, 1462-1470, doi:10.1111/j.1524-4725.2009.01259.x (2009).

Zysk, A. M., et al. Optical coherence tomography: a review of clinical development from bench to bedside. J Biomed Opt 12, 051403, doi:10.1117/1.2793736 (2007).

\* cited by examiner

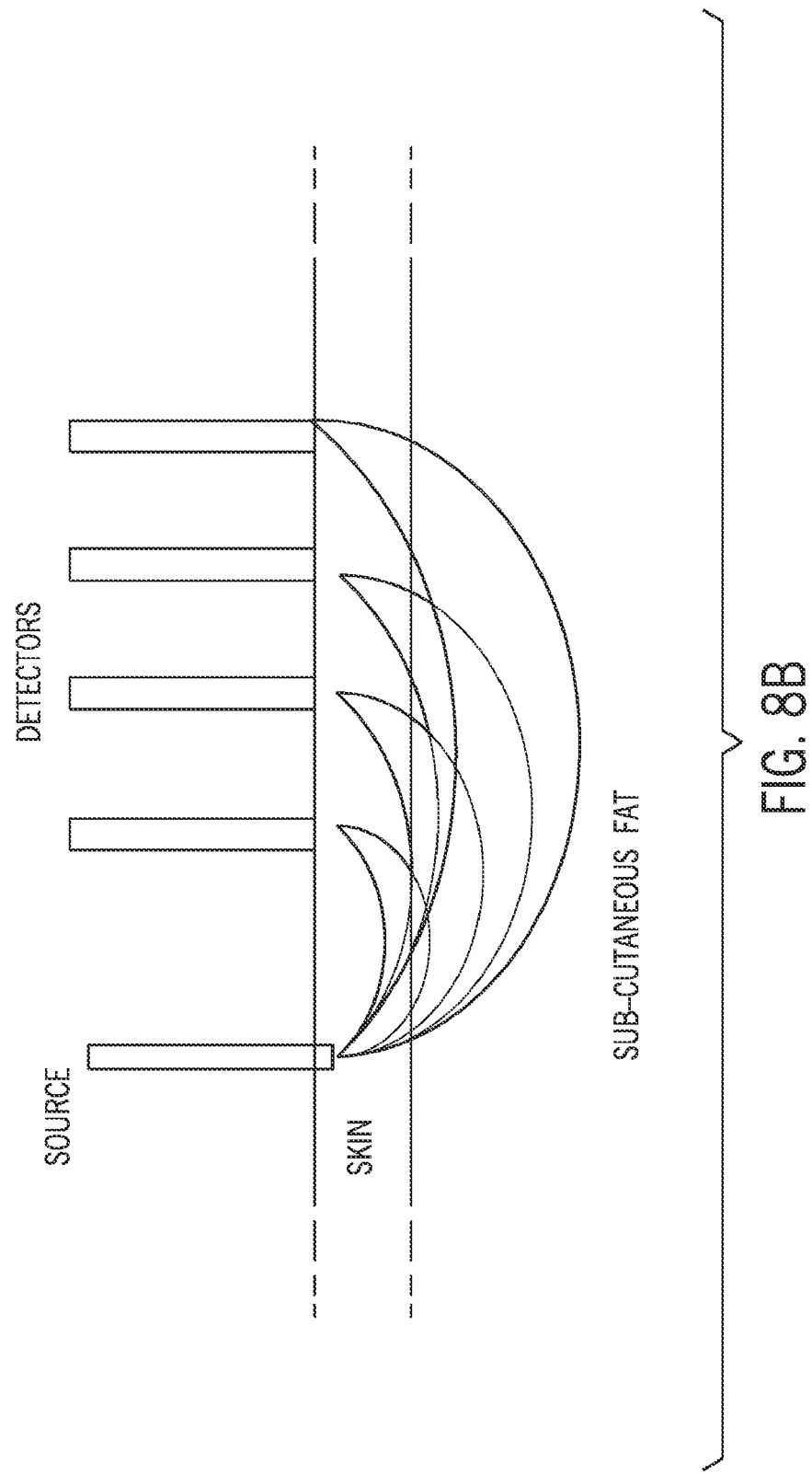

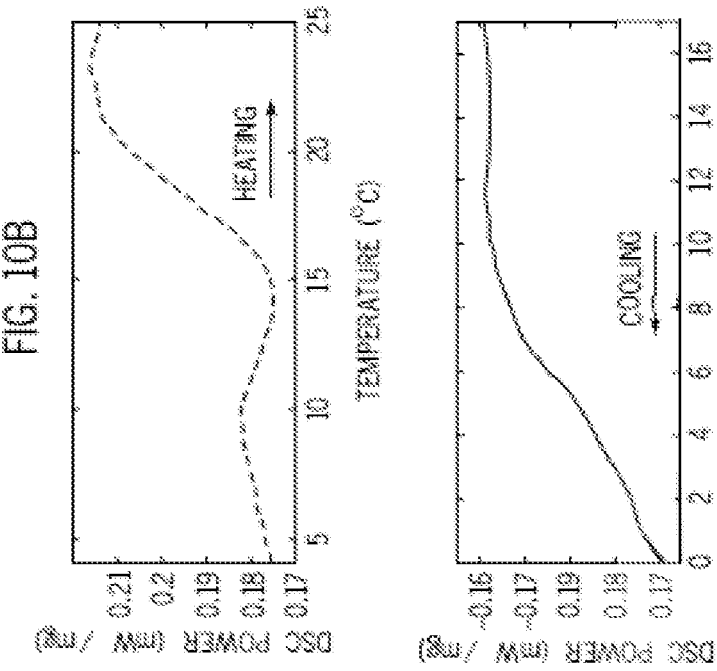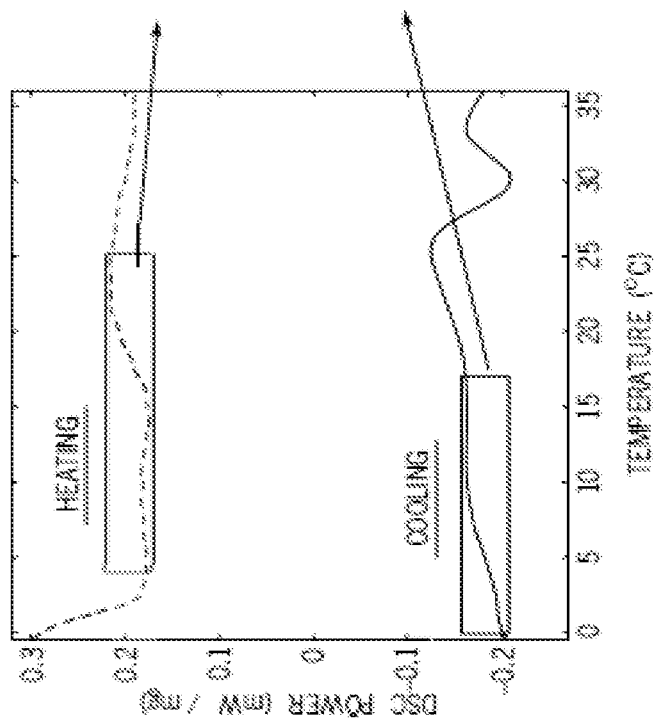

SYSTEMS AND METHODS FOR CHARACTERIZING BIOLOGICAL MATERIAL USING NEAR-INFRARED SPECTROSCOPY

CROSS-REFERENCE TO RELATED APPLICATIONS

This application is a U.S. Continuation Application of U.S. application Ser. No. 16/332,243 filed Mar. 11, 2019 which is a U.S. National Stage of PCT Application No. PCT/US2017/051266 filed on Sep. 13, 2017 which claims the benefit of, and incorporates herein in its entirety, U.S. Provisional Patent Application Ser. No. 62/393,743 filed on Sep. 13, 2016 and entitled "SYSTEM AND METHODS FOR MONITORING PHASE KINETICS IN BIOLOGICAL TISSUE USING NEAR INFRARED SPECTROSCOPY."

BACKGROUND

The field of the disclosure is related to characterizing biological material using optical methods. More particularly, the disclosure is directed to systems and methods for characterizing biological material based on phase information obtained using near-infrared spectroscopy ("NIRS").

Excess adipose tissue can pose a variety of local and systemic problems, and can be aesthetically undesirable. As an alternative to more invasive procedures, cryolipolysis has been introduced to reduce fat deposits by way of hypothermic treatment. In cryolipolysis, fat cells can be destroyed through controlled cooling of targeted areas down to temperatures ranging between 10 and −10° C. Clinical studies have demonstrated the efficacy of cryolipolysis for subcutaneous fat removal, and although the exact mechanism of action is not yet completely understood, a phase transition in the adipose tissue (lipid crystallization) is correlated to clinical efficacy.

Hyperthermic treatment of biological tissues and materials has also been applied in a variety of other medical applications, including oncologic, cardiovascular, and other interventional procedures. For instance, ablation therapy, which utilizes electrical current or radiofrequency energy to elevate temperatures to the point of cell destruction, has been used to remove critical or malignant tissue. Typically, living tissue can be permanently compromised at temperatures sustained for several seconds above approximately 45° C. Also, in some applications, elevated temperatures have been used to enhance an effectiveness of an administered medication or treatment, such as chemotherapy.

In general, guidance, monitoring and assessment of hypothermic or hyperthermic treatments have been based on various image modalities, including computed tomography ("CT"), ultrasound ("US"), and magnetic resonance ("MR") imaging and others. In some applications, temperature measurements have also often used as a feedback for controlling the timing of an applied thermal treatment.

However, such approaches may require costly equipment and capabilities, and often provide limited information. For instance, temperature measurements, using thermistor or thermocouple sensors located on a hyperthermic or hypothermic catheter, might not directly indicate the condition or structure of affected tissues, which can lead to uncertainty or over-treatment. Moreover, measurements are typically associated with biological tissue in direct contact to the sensors. Hence temperature profiles further away from the measurement site would then have to be inferred or approximated using other information. As appreciated, crude temperature information might not be sufficient when performing in proximity to critical structures, or when non-destructive thermal treatments are employed.

Hence, in light of the above, there is a need for systems and methods for characterizing and monitoring biological material subjected to thermal and possibly other treatments.

SUMMARY

The foregoing and other aspects and advantages of the present disclosure will appear from the following description.

In one aspect of the present disclosure, a system for characterizing biological material is provided. The system includes an optical system comprising a source module and a detector module, wherein the source module is configured to generate light signals and a detector module is configured to detect light signals. The system also includes an optical coupling configured to engage a biological material and to transfer light signals between the optical system and the biological material, and a controller. The controller is configured to control the optical system to transmit light signals to the biological material and to detect light signals therefrom, and conduct an analysis, using optical data corresponding to the light signals detected, to determine optical properties of the biological material. The controller is also configured to determine, using the optical properties, phase information corresponding to the biological material, and generate, using the phase information, a report characterizing the biological material.

In another aspect of the present disclosure, a method for characterizing biological material is provided. The method includes acquiring optical data associated with a biological material, and analyzing the optical data to determine optical properties of the biological tissue. The method also includes determining, using the optical properties, phase information corresponding to the biological material, and generating a report characterizing the biological tissue using at least the phase information.

In yet another aspect of the present disclosure, a method for characterizing biological tissue is provided. The method includes acquiring, using an optical system, optical data associated with a biological tissue, and analyzing the optical data using a light transport model to determine optical properties of the biological tissue. The method also includes determining at least phase information using the optical properties, and generating, using at least the phase information, a report characterizing the biological tissue.

In yet another aspect of the present disclosure, a system for monitoring a biological material is provided. The system includes an optical system configured to transmit light signals to a biological material and receive light signals therefrom, and a computer in communication with the optical system. The computer is configured to control the optical system to generate optical data based on the light signals received from the biological material, and analyze the optical data to determine optical properties of the biological material. The computer is also configured to determine, using the optical properties, phase information corresponding to the biological material, and generate a report indicative of the phase information. The system may also optionally include a treatment system in communication with the computer and configured to apply a treatment to the biological material based on the report.

In the description, reference is made to the accompanying drawings that form a part hereof, and in which there is shown by way of illustration a preferred embodiment of the invention. Such embodiment does not necessarily represent the full scope of the invention, however, and reference is made therefore to the claims and herein for interpreting the scope of the invention.

BRIEF DESCRIPTION OF THE DRAWINGS

The present disclosure contains at least one drawing executed in color. Copies of this patent or patent application publication with color drawing(s) will be provided by the Office upon request and payment of the necessary fee.

FIG. 8B is a schematic showing sensitivity profiles for example NIRS measurements and their spatial relationship to the skin and subcutaneous fat layers.

FIG. 10A is a graph showing an example Differential Scanning calorimetry ("DSC") traces for a sample tissue during heating and cooling.

FIG. 10B is a graph showing heating detail in FIG. 10A.

FIG. 10C is a graph showing cooling detail in FIG. 10A.

DETAILED DESCRIPTION

Figure 1A:
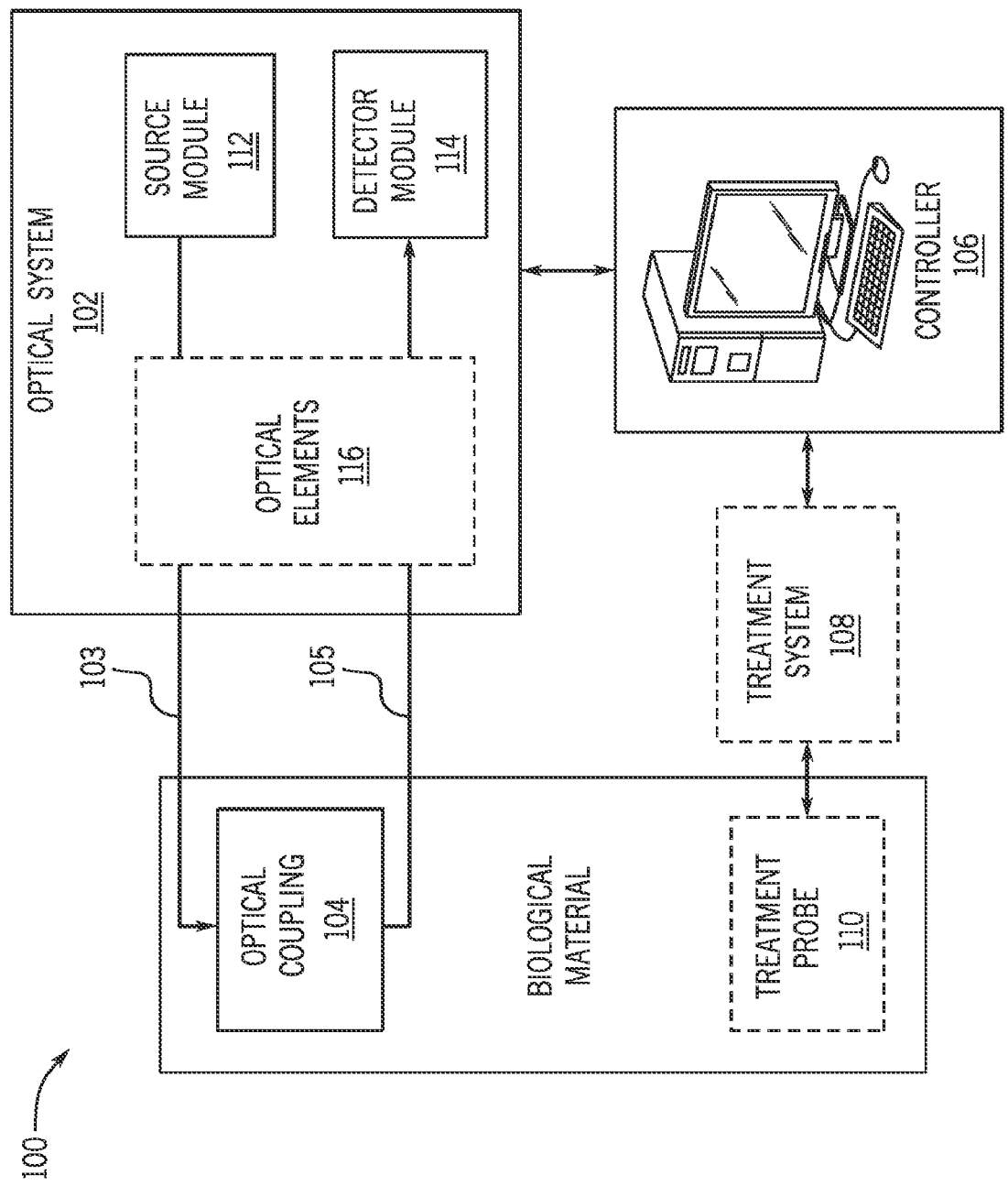
FIG. 1A is a schematic diagram illustrating an example system, in accordance with aspects of the present disclosure.

The present disclosure is directed to systems and methods for characterizing and monitoring biological material. In particular, a novel approach is herein introduced for characterizing biological material based at least on phase information obtained using optical measurements.

Various terms are used throughout the present disclosure. Such terms are to be given their ordinary meaning in the art unless indicated otherwise. In particular, the term "phase" refers generally to a state of matter, which may include a solid, liquid, gas, and others states of matter. "Phase" may also refer generally to a characteristic of matter, which may include a material form (e.g. crystalline, amorphous, and so on), order, structure, morphology, composition, and other characteristics of matter.

The terms "phase transition" or "phase transformation" refer generally to a change in the state of matter, or a change in one or more characteristics of matter, or both.

The term "phase kinetics" refers generally to processes or dynamics associated with phase transitions and transformations, which may include crystallization, solidification, coagulation, polymerization, denaturation, liquefaction, precipitation, condensation, freezing, melting and others.

The term "phase information" refers generally to any information pertaining to phase, phase changes, phase transitions, phase transformations, and phase kinetics, as described.

The term "biological material" refers generally to any material, substance or composition associated with living and non-living organisms or organism structures, including cells, tissues, organs, fluids, bones, muscle and other biological components or structures. "Biological material" may also refer generally to any human and non-human material, substance or composition. "Biological material" may also refer generally to bio-compatible, biodegradable or artificial material, substance or composition. "Biological material" may also refer generally to any material, substance or composition that is self-replicating.

Unless stated otherwise, when used in reference to a stated nominal value, the terms "approximately", "about", "around," "roughly," and other synonyms, may be generally understood to allow for the stated nominal value to vary by up to ±10%. Similarly, when used in reference to a range specified by stated end range values, "approximately" and/or "about" may be generally understood to allow for either one or both of the stated end range values to vary by up to ±10%.

As will be appreciated from description herein, the present disclosure provides for a wide range of application. In some aspects, the present systems and methods may be utilized to characterize and monitor biological material subjected to thermal treatments. To this end, a variety of phase information associated with the biological materials may be obtained, either invasively or non-invasively, and in substantially real-time. In one application, local phase information associated with one or more cells or tissues, including tissue structure or morphology, can be obtained using the present systems and methods. In another application, the present approach may be used to obtain phase information from a biological material while undergoing thermic processes or procedures, including phase transitions, as well as onsets, fronts, locations, depths, profiles, and other properties associated with the phase transitions. For example, changes in morphology and structure of cells or tissues may be monitored while heat or cold is being applied. In yet another application, cell or tissue reactions, such as protein denaturation and cell necrosis, may be determined and monitored based on phase and other information.

The formation of lipid crystals during selective cryolipolysis ("SC"), or fat freezing, involves localized destruction of fat deposits. In adults, the amount of saturated and unsaturated fatty acid varies between different individuals, at different anatomical locations and among cell types. For instance epidermal and dermal cells contain less lipids as compared to underlying adipocytes cells (subcutaneous fatty tissue). Thus, different cell types have different susceptibility to cooling or heating. In practice, the temperature point at which fatty tissue crystallizes due to an applied cooling can vary depending on the amount of saturated and unsaturated triglycerides present. The composition of fat, or ratio of unsaturated to saturated fatty acids, can also vary within adipose tissue in relation to anatomical location, for instance whether in superficial versus deeper locations. Furthermore, the composition of fat can vary between subjects, being affected by different metabolic states and nutritional uptake. Therefore, real-time monitoring the phase information during hypothermic and hyperthermic procedures, for instance, to determine occurrences of crystallization or liquefaction of tissues, is highly advantageous for controlling treatment.

In particular, monitoring the onset and spatial distribution of fat freezing can improve the dosimetry of the treatment and further minimize variations in treatment efficacy. Such monitoring could also be used to determine the endpoint of the treatment process, and therefore help to either shorten the treatment time when a preset endpoint of tissue response is reached, or to increase the treatment time to guarantee a preset treatment response. In addition, changes in fat tissue morphology and the kinetics of fat phase changes at different applied temperatures can help elucidate the mechanisms of fat cell removal and efficiency of SC, as well as other therapies. Also, phase changes can also be used to assess and correlate desirable clinical and/or therapeutic endpoints. Examples include the induction of adipocyte apoptosis induced by lipid crystallization, and the induction of collagen damage as evidenced by collagen melting and change of near-infrared scattering.

Other applications of the present systems and methods may also include fibrosis, which is characterized by excessive amounts of collagen arranged in a disorganized pattern. Specifically, fibrosis can be detected and/or monitored using phase information, in accordance with the present disclosure. The non-invasive diagnosis, quantification and time evolution of fibrosis may also provide valuable insight into various medical conditions.

In addition to medical applications and clinical treatments, such as cryolipolysis and others, as described, the present disclosure may also find application in other scenarios or processes where phase information might be of importance. For example, the present approach may be relevant to food storage and processing applications, to provide indications as to the quality or state of food.

Turning now to FIG. 1A, a block diagram of an example system 100, in accordance with aspects of the present disclosure, is shown. In some implementations, the system 100 may be used for characterizing and/or monitoring biological material. Non-limiting examples of biological material characterized or monitored using the system 100 may include fat tissue, dermal tissue, epidermal tissue, muscle tissue, and other tissues, although the system 100 may find a broad range of application.

As shown, the system 100 may generally include an optical system 102, an optical coupling 104 in communication with the optical system 102, and a controller 106 in communication with the optical system 102. As will be described, the controller 106 may be configured to control the operation of the system 100, and various components therein, as well as to carry out various analyses, in accordance with the present disclosure.

The system 100 may optionally include a treatment system 108 in communication with the controller 106. The treatment system 108 may be configured to engage and/or provide a treatment to the biological material in order to control a procedure or a process to which the biological material is being subjected. As examples, the treatment system 108 may include a radiation system, an ultrasound system, a shock wave system, an infrared ("IR") radiation system, a radiofrequency ("RF") system, a laser system, a surgical system, a thermal system, an ablative system, a cryogenic system (e.g. system for cryolipolysis, cryoablation, cryopreseravation), and so forth.

The treatment system 108 may include a treatment probe 110, as well as other components, elements, devices and hardware. In some embodiments, the treatment probe 110 may be configured to elevate or reduce the temperature of the biological material in a hyperthermic or hypothermic treatment. In other embodiments, the treatment probe 110 may be a surgical or interventional device. For instance, the treatment probe 110 may include a cannula, a catheter, and so forth. Although the treatment probe 110 is shown in FIG. 1A to be separate, and displaced, from the optical coupling 104, it may be appreciated that these may be integrated in a single unit and/or located in substantial proximity.

As shown, the optical system 102 may include an optical coupling 104. The optical coupling 104 may be configured to engage, couple to, or be placed at, near or within targeted locations in the biological material to transmit light signals thereto and receive light signals therefrom. The optical coupling 104 may be in any form and include a variety of sensors or elements. In accordance with aspects of the disclosure, the optical coupling system 104 may be used to probe optical properties of the biological material for determining various phase information including phase or phase kinetics. To this end, the optical coupling 104 may be configured with a number of optical sensors. Preferably, the optical coupling 104 includes near-infrared spectroscopy ("NIRS") sensors, as well as other optical sensors. Additionally, various physiological sensors may be incorporated into the optical coupling 104. Example physiological sensors may blood pressure sensors, temperature sensors, respiration sensors, oxygenation sensors, cardiac sensors and others.

In some designs, the optical coupling 104 may be in the form, or part, of an attachable or wearable object. For example, the optical coupling 104 may include a bandage, headband, belt, clamps and the like. The optical coupling 104 may also be coupled to, or integrated into, an interventional, surgical or treatment device, such as the treatment probe 110.

As shown in FIG. 1A, the optical coupling 104 may include one or more source probes 103 configured to transmit light signals to the biological material that are generated by a source module 112 of the optical system 102. The optical coupling 104 may also include one or more detector probes 105 configured to receive light signals from the biological material, and direct the received signals to a detector module 114 of the optical system 102. The source probes 103 and detector probes 105 may include various optical probes or connections including optical waveguides, fibers, fiber bundles, and the like. In some implementations, the source probes 103 and detector probes 105 can also be designed to perform both light transmission and light detection, either sequentially or concurrently.

The source probes 103 and detector probes 105, along with the optical coupling 104, may be arranged to detect reflected and/or transmitted light signals from the biological material using a variety of configurations, depending upon the desired mode of operation or measurement type. For instance, in one configuration, a source probe 103 may be paired with single detector probe 105. In another configuration, a source probe 103 may be paired with multiple detector probes 105 arranged at various distances from the source probe 103. It may be readily appreciated that various source probe 103 and detector probe 105 combinations are possible. In addition, the source-to-source, source-to-detector, and detector-to-detector probe separations may be up to 8 cm, or more. Additionally, or alternatively, one or more source probe 103 and/or detector probe 105 may located in substantial proximity, for example, less than 1 cm apart.

Figure 1D:
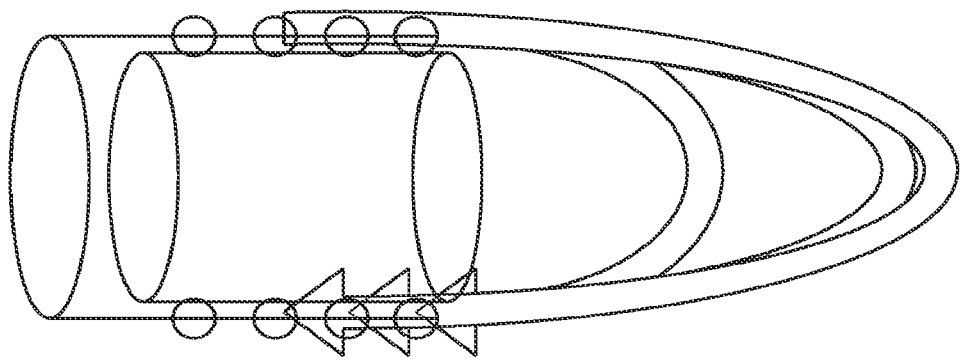
FIG. 1D is a schematic diagram illustrating yet another example optical probe, in accordance with aspects of the present disclosure.
Figure 1B:
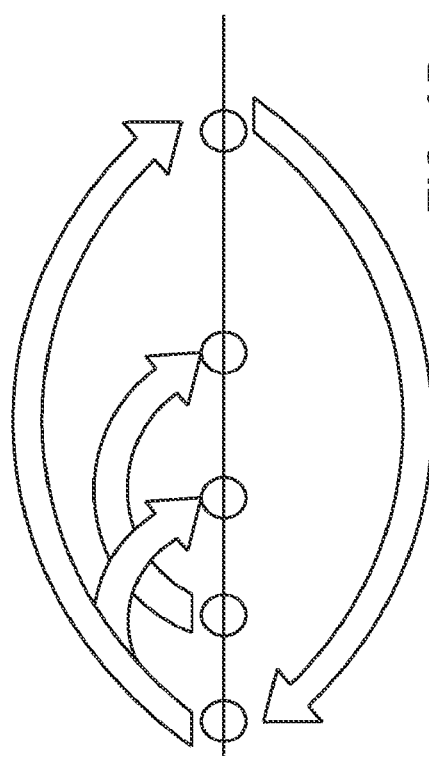
FIG. 1B is a schematic diagram illustrating an example optical probe, in accordance with aspects of the present disclosure.
Figure 1C:
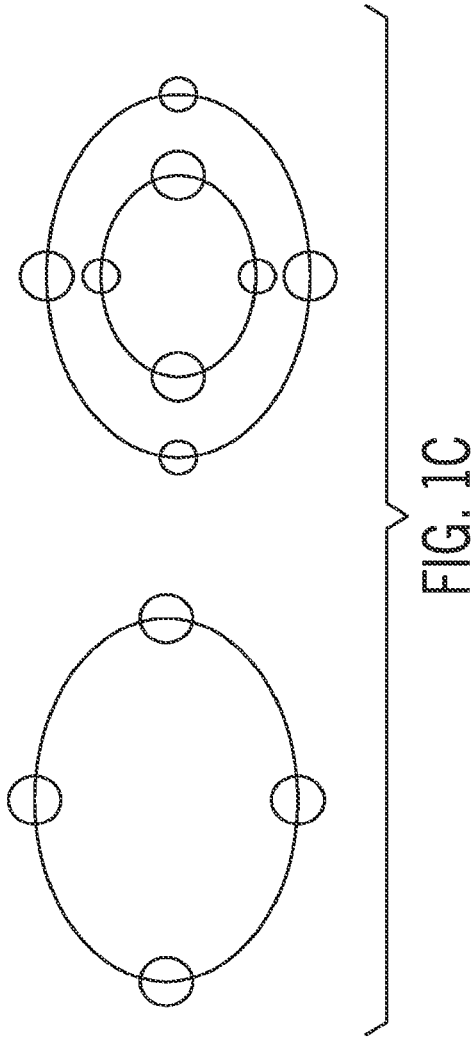
FIG. 1C is a schematic diagram illustrating another example optical probe, in accordance with aspects of the present disclosure.

FIGS. 1B-1D show non-limiting examples of one-dimensional, two-dimensional and three-dimensional configurations using various source probes 103 and detector probes 105, as described. In particular, FIG. 1D shows source probes 103 and detector probes 105 arranged along a radius of a rod-like device. Such compact configuration allows multiple source/detector probes to be integrated into an applicator configured to provide cooling or heating, for example. This affords real-time monitoring and control in a very convenient and automated manner without the need for interrupting treatment to measure a treated area, as would be required when using separate treatment and detection units.

Referring again to FIG. 1A, the source module 112 may be configured to generate monochromatic, (single wavelength), multi-chromatic (multiple wavelengths) or broadband (a range of wavelengths) light signals. As such, the source module 112 may include various hardware components, including one or more optical sources or light emitters. Example optical sources include incandescent source or fluorescent light sources, light emitting diodes ("LEDs"), super luminescent LEDs, lasers or laser diodes and other light sources. The source module 112 can operate in a continuous-wave mode or modulated wave mode by generating light signals that are continuous (steady), or modulated in the frequency domain and/or time domain. As an example, the modulated light may include pulsed light, sinusoidally modulated light, step modulated light, triangularly modulated light, or arbitrarily modulated light.

The properties of light signals generated by the source module 112, including wavelength, intensity, power, modulation, timing, and so on, may be configured, programmed, adapted or selected based on the specific application, analysis being performed, or phase information required. To this end, the source module 112 may include various hardware that allows for local/internal or remote/external programming. Example hardware can include wave generators, synthesizers, modulators, amplifiers, mixers, and so on.

In some aspects, the source module 112 may be configured to generate light signals with wavelengths in the near-infrared spectrum. By way of example, light signals can have wavelengths approximately between 500 nm and 2500 nm, although other wavelengths are possible. In addition, light signals can have an average power approximately between 10 μW and 10 W, although other values are possible. In the case of pulsed light, light pulses can have pulse widths approximately between 1 ps and 50 ns, although other values are possible.

The detector module 114 may be configured to detect various light signals from the biological material. To this end, the detector module 114 may include various hardware including one or more detectors, such as semiconductor photo diodes, PIN photodiodes, CCD and CMOS image sensors, photon-counting avalanche photodiodes (APDs) and others. In some implementations, detectors in the detector module 114 may be frequency sensitive, or be configured to perform detection in the frequency domain. In other implementations, detectors in the detector module 114 may be to perform detection in the time domain, allowing for determining photon time-of-flight, for example, in a time-resolved fashion.

The optical system 102 shown in FIG. 1A may optionally include a number of optical elements 116 interposed between the optical coupling 102, source module 112 and detector module 114, respectively. The optical elements 116 may be configured for manipulating light signals transmitted to and received from the biological material. For example, the optical elements 116 may include various lenses, prisms, holograms, diffractive optical elements, diffusers, attenuators, filters, optical fibers, and so forth. Although shown in FIG. 1A as separate elements, in some designs, various portions of the source module 112, detector module 114, optical elements 116, and the optical coupling 104 may be combined or integrated into a single unit.

As described, the controller 106 may be configured to control operation of the system 100. Specifically, the controller 106 may be configured to control the optical system 102 to perform, either autonomously or semi-autonomously, data acquisition and processing. Optionally, the controller 106 may also control the treatment system 108 to control a treatment, as described. To this end, the controller 106 may access and execute instructions, for example stored in a non-transitory computer-readable medium or other medium, including a hard drive, a CD-ROM, flash memory and the like. The controller 106 may also receive instructions from a user via an input (e.g. keyboard, mouse, touchscreen, and so on), or any other source logically connected thereto, such as a networked computer, server, database, the internet, cloud, and so forth. The controller 106 may provide feedback to the user via an output (e.g. display, screen, and so on), either intermittently or in real-time. The controller 106 may further send operational instructions, data, and other information to the optical system 102, the treatment system 108, a memory, a networked computer, server, database, the internet, cloud, and so forth.

In general, the controller 106 may be any computer programmed to carry out steps in accordance with aspects of the present disclosure, including characterizing and monitoring biological material. As such, the controller 106 may generally include one or more processors, processing and/or graphical units, memory, input elements, output elements, and others. As examples, the controller 106 may be a workstation, a laptop, a mobile device, a tablet, a personal digital assistant ("PDA"), a multimedia device, a network server, a mainframe or any other general-purpose computing device. However, the controller 106 need not be a general-purpose computer, but rather a device or apparatus that is application-specific by way of programming or instructions directly configured or hardwired therein, in accordance with methods described herein, as well as other software and hardware configurations.

Although the controller 106 is shown in FIG. 1A as separate from the optical system 102, and treatment system 108, it may be appreciated that these, or portions thereof, may be integrated into one system, apparatus or unit. For example, the optical system 102 may be a single unit that includes a computer, or hardware capable of computation, as described herein. To this end, the controller 106 may include various internal and external communication capabilities.

In some aspects, the controller 106 may be configured to direct the acquisition and processing of optical data, such as NIRS data, and other physiological data to obtain phase information associated with biological material being characterized or monitored. In particular, the controller 106 may be configured to determine the optical properties of targeted biological material, such light absorption and scattering properties, by using a light transport model. Other example modeling methods for determining optical properties can also include the Beer Lambert Law, the modified beer Lambert Law, including a differential path-length factor, analytical or numerical (finite difference finite element, Monte Carlo) modeling of the radiative transport equation and simplified version, such as the P-n and delta-P-n approximations, the standard diffusion approximation or diffusion approximation and others.

In some implementations, analysis or modeling applied to the optical data by the controller 106 may rely on general or specific data corresponding to various regions of interest in the biological material, including geometrical and material properties, structure, and so on. Such data may be obtained from anatomical atlases, imaging, and other sources. For example, geometrical properties, such as layers, cavities, curvature, sizes, shapes, dimensions, depths of specific, and so on, may be determined from X-ray, magnetic resonance, ultrasound and other imaging. The controller 106 may access the data either directly from an imaging system, or from a memory, database, server or elsewhere. The controller 106 may then process the accessed data. For example, the controller 106 may analyze imaging, or carry out a processing of differential overlapping sensitivity profiles of source-detector pairs in which photon time of flight is account. Imaging, optical and other data may also be used by the controller 106 to determine mechanical properties of the biological material, such as elastic, viscoelastic properties.

In some aspects, the controller 106 may be configured to determine phase information, including phase, phase transitions or phase kinetics, associated with biological material. To do so, the controller 106 may process the acquired optical data by assembling and analyzing various waveforms indicative of optical properties, such as optical scattering. The waveforms may reflect time or temperature evolution, or both, of the optical properties in terms of raw, relative, or absolute values. To this end, the controller 106 may utilize temperature and other measurements to assemble the waveforms.

In some aspects, the controller 106 may analyze the waveforms to determine various features such as inflexion points, slopes, derivatives, plateaus, magnitudes and others. Such features may then be compared with predetermined, absolute or relative, thresholds, for example stored in a database or memory, to determine phase information that can be used to characterize as well as predict a condition of the biological material, such as a direction or rate of phase change. In addition, the controller 106 may identify phase information for different portions or regions of the biological material. In one example, the controller 106 may determine, based on analyzed NIRS data, locations or regions in the biological material that are in a particular phase, such as in a solid or liquid phase, for instance. In another example, the controller 106 may determine, based on analyzed NIRS data, locations or regions subject to or near a phase transformation, for instance, as a result of a hypothermic or hyperthermic treatment.

Based on the determined phase, and other information, the controller 106 may also be configured to inform or coordinate a treatment being applied to the biological material. For instance, the controller 106 may analyze the phase information obtained to determine a progress, status or effectiveness of the treatment. In so doing, the controller 106 may identify whether a target or condition has been achieved or exceeded, or whether the treatment should be adapted or ceased. For example, the controller 106 may identify whether one or more regions of interest have a predetermined phase or whether such region(s) are subject to or near a phase transition. The controller 106 may generate and provide an indication informing a user or clinician with regard to the treatment.

Phase and other information obtained may then be provided in a report generated by the controller 106. The report may be in any form, such as a visual or audio form, and provide various information and properties characterizing the biological material. The report may updated and provided in real-time, or intermittently. In one example, the report may provide phase-based maps, indicating the spatial distribution of various predetermined phases, or phase changes, across a biological material. Such phase-based maps may be overlaid on corresponding anatomical or other images.

The report may also indicate phase kinetics or phase changes as a function of time as well as temperature. For example, the report may provide an indication, either visually or using audio signals or alarm, for the occurrence of a specific phase or change in phase, such as crystal formation or dissolution, during a thermal treatment.

As described, the controller 106 may communicate with, and control, the treatment system 108. To this end, the controller 106 may utilize determined phase, as well as other information, to generate signals for controlling the duration, timing, and location of a provided by the treatment system 108. In some aspects, the report may be generated and provided in a time that is consistent with a provided treatment. For example, the report may be updated with sufficient speed to allow for a clinician or the treatment system 108 to adapt or cease treatment as necessary. In some aspect, the report may also indicate an effectiveness, progress or status of a treatment.

Figure 2:
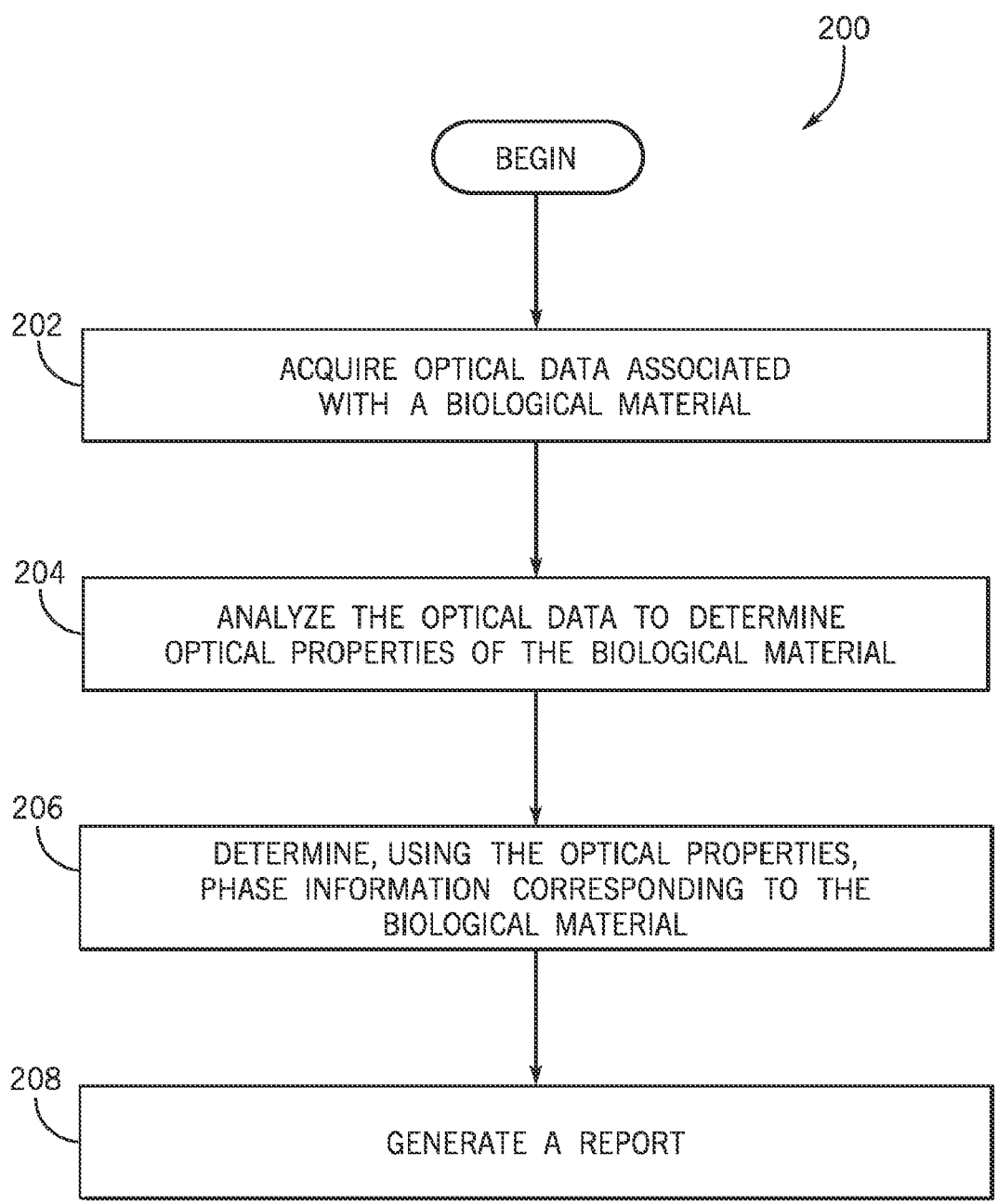
FIG. 2 is a flowchart setting forth steps of a process, in accordance with aspects of the present disclosure.

Turning now to FIG. 2, a flowchart setting forth steps of a process 200 in accordance with aspects of the present disclosure is shown. The process 200, or various steps therein, may be carried out using any suitable system or device, such as the system described with reference to FIG. 1. In some implementations, the process 200 may be configured as program or executable instructions stored in non-transitory computer readable media or other memory.

The process 200 may begin at process block 202 with acquiring optical data, including NIRS data, associated with a biological material being characterized or monitored. Non-limiting examples of biological material include fat, dermis, epidermis, muscle, and other tissues. In some aspects, physiological data, based on temperature, pressure and other measurements, may also be acquired at process block 202. The data may be acquired at process block 202 either continuously, in real-time, or intermittently, depending on the particular application. In some aspects, the data may be acquired before, during or after the application of a treatment, procedure, or process applied to the biological material. Alternatively or additionally, data acquired at process block 202 may be received or accessed from a memory, database, or other storage location.

At process block 204, an analysis of the optical data may then be performed to determine optical properties, such as absorption or scattering properties, for the biological material or various selected or identified regions in the biological material. In some aspects, the analysis may be performed while a treatment is being applied to the biological material or regions thereof. In this manner, information may continuously be provided, allowing for the treatment to be adapted in real-time, as necessary. The analysis performed at process block 204 may include applying a light transport model. Example light transport models include the Beer Lambert Law, the modified beer Lambert Law, including a differential path length factor, analytical or numerical (finite difference finite element, Monte Carlo) modeling of the radiative transport equation and simplified version, such as the P-n and delta-P-n approximations, the standard diffusion approximation or diffusion approximation and others. As described, image information may also be used in the analysis, for example, to obtain material or geometrical information associated with the biological material. In some aspects, mechanical properties associated with the biological material may also be determined at process block 204 from the acquired optical and other data. Example mechanical properties include elastic, viscoelastic and other properties. Other information required in the analysis may be obtained from a memory or database.

Then, at process block 204, the optical properties obtained may be used to determine phase information corresponding to biological material or various regions in the biological material. In one example, phase information may indicate the presence or absence of a predetermined phase, such as a crystal phase, an amorphous phase, a liquid phase, or a phase characteristic. Phase information may also indicate phase kinetics or phase changes, such as crystal formation or crystal dissolution with time or temperature. As such, one or more waveforms or plots, corresponding to the biological material or regions therein, may be assembled. The waveforms may indicate the variation of optical properties with time or temperature, as well as other factors, although they need not be displayed.

The waveforms may then be analyzed to identify various features that may be used to determine phases, phase changes, directions and rates of phase changes, and other phase information corresponding to biological material or various regions in the biological material. For example, the onset of a phase changes may be determined using inflection points in the time or temperature waveforms. Inflection points may be determined, for instance, by computing various derivatives, such as first derivatives or higher order derivatives. Other waveform features, including waveform amplitudes or values, plateaus, curvatures, slopes and so on, may also be identified and used to determine phase information. In some aspects, waveform features may be compared with predetermined values, thresholds, slopes, curvatures, inflexion points, and so on, in order to determine the phase information.

Phase information determined at process block 206 may be used to generate one-dimensional, two-dimensional or three-dimensional maps using color-coded or gray scales. The maps may indicate various locations or regions in the biological material having one or more predetermined phases, such as crystalline or non-crystalline phases (e.g. amourphous phase, liquid phase, and so on). The maps may also indicate various locations or regions having one or more phase changes. In some applications, the maps may also incorporate, or be combined with, image information. For instance, phase contour maps may be superimposed on anatomical images.

Then at process block 208, a report in any form may be generated. The report may provide, via a display or other output, phase information, optical properties, mechanical properties, and other information characterizing the biological material, either intermittently or in substantially real time. In one example, the report may provide waveforms or phase-based maps, indicative of phases, phase kinetics or changes with time or temperature. The report may also indicate a progress, status or effectiveness of a treatment, procedure or process, and in some implementations, information or indications for adapting a treatment, procedure or process. The report may also include instructions executable by a treatment system. For example, the report may include data or information for controlling treatment, including parameters such as temperature set points, remaining treatment times, cooling or heating power delivered, and others.

As described, phase information may be used to assess or predict an effectiveness of a treatment such as whether a target outcome has been reached. For example, phase information may be used to identify the crystallization of fat tissue or water as a result of hypothermic treatment. In another example, cryolipolysis therapeutic outcomes could be predicted by determining the amount or ratio crystallized fat, as well as its spatial distribution. Phase information may also be used to adapt a treatment. For example, phase kinetics may be used to predict a future condition of the biological material, and when appropriate, adapt treatment parameters or conditions. In a thermal treatment, parameters may include target temperature, cooling rate, cooling time, power, applicator placement, and so forth. Phase information may also be used to identify a condition of the biological material. For example, phase, and other, information may be used to distinguish apoptosis and necrosis, as a result of a radiation, chemotherapy, laser exposure or other treatment. Also, phase information may be used to distinguish different tissue types, amounts, or compositions. For example, saturated and unsaturated fat may be distinguished, and in some cases treated separately, based upon different phase transition temperatures.

As appreciated from descriptions above, the approach of the present disclosure has a broad range of applicability. For instance the system and method described may be used to monitor phase change and/or crystal formation in tissue (fat, and other tissues), for use in a variety of surgical and non-surgical applications. Other applications may include cryolipolysis, liver cryosurgery, prostate cryosurgery, breast cryosurgery, tumor removal, cryopreservation, cryoablation for atrial fibrillation, hyperthermia, laser treatment, laser ablation, radiation treatment, and so forth. In addition, the present approach may be applied to the food industry applications, including monitoring freezing, storage and cooking processes of food, such as meats, poultries, vegetables, pastries, and so forth.

In addition to descriptions above, specific examples are provided below, in accordance with the present disclosure. These examples are offered for illustrative purposes only, and are not intended to limit the scope of the present invention in any way. Indeed, various modifications in addition to those shown and described herein will become apparent to those skilled in the art from the foregoing description and the following example and fall within the scope of the appended claims.

EXAMPLE I

The present study aimed to investigate phase change kinetics due to temperature variation in subcutaneous fatty tissue using Near-Infrared Spectroscopy ("NIRS"). Temperature gradients and optical scattering were correlated to discover phase transition point in both cooling and heating processes. In particular, results herein show that changes in optical properties of the tissue (e.g. absorption ($\mu_a$) and scattering ($\mu_s$) coefficients), measurable with NIRS, can reveal changes in the morphology of the tissue.

The NIRS probe used in this study included a source modulated to emit light at different wavelengths and several PMT detectors. Pig skin samples with thick subcutaneous fat layer were used to measure the variations in scattering and absorption properties of the tissue during cooling and heating. Two thermocouples were placed in the fatty tissue layer in the proximity where the optical properties were probed. Tissue was cooled/heated during the experiments using a chiller with an aluminum probe placed on the skin side while the NIRS probe is located on the fat side to measure the scattering/absorption in the fat layer. Optical properties of multiple samples were measured using cyclic cooling/heating over a temperature range between 0 and 40° C.

As will be described, results show that, in general, optical scattering decreases at higher temperatures, and increases at lower temperatures. A distinct change in the rate of change of scattering was discerned during phase transitions of the fatty layer, with two transition points observed around 5-10° C. and 20-25° C. The hysterics observed during the cooling/heating cycles could also be indicative of polymorphic crystallization or different crystal structures of the fat tissue at different temperatures.

These results indicate that kinetics of phase change due to temperature cycling can be monitored using methods described herein. Scattering properties can be measured and correlated to the temperature and phase change in fat tissue, and other tissues or substances, could be predicted. In particular, the temperature vs. scattering changes can be used to obtain the phase transition point and the correlation can be derived to predict the transition point.

Materials and Methods

Optical measurements were performed using a frequency-domain near-infrared spectrometer (model 96208, ISS, Champaign, Ill.). The instrument used four parallel photomultiplier tube detectors that were time shared by eight laser diode emitting at 635, 670, 691, 752, 758, 782, 811, and 831 nm, respectively. The frequency of the intensity modulation was set to 110 MHZ, and heterodyne detection was performed with a cross-correlation frequency of 5 kHz. A complete acquisition cycle over the eight wavelengths was completed every 80 ms. The laser diodes and the photomultiplier tubes were all coupled to fiber optics. The eight 400 µm individual illumination fibers were assembled into a 2 mm fiber bundle. The collecting circular fiber bundles were 3.0 mm in internal diameter. The optical fibers were assembled on a plastic plate to be in contact with the skin tissue. The optical probe had one laser source bundle and three fiber bundles which were placed 1.5, 2, and 2.6 cm away from the source fiber bundle. Tissue optical properties (absorption, $\mu_a$, and scattering, $\mu_s$, coefficients) were derived from measurements at multi-distant fitting algorithm as described previously.

A water operated chiller (JULABO USA Inc.) with the temperature range of −25° C. to 40° C. was used to cool/warm the tissue. A water-circulated cuboid shape aluminum probe was fabricated to generate a uniform surface heat exchange between tissue and the probe. Temperature measurements were performed using two thermocouple probes connected to a thermometer (model HH66U Omega Engineering®). The temperature data were recorded using TempMonitor_S2 software. The optical probe was placed on the plastic sheet face to the skin layer.

Pig skin samples with thick subcutaneous fat layer were use, and the variations in scattering and absorption properties of the tissue were measured during cooling and heating.

Two thermocouples were located in the fatty tissue layer in the proximity where the optical properties are measured using NIRS probe. Tissue was cooled/heated during the experiments using the aluminum probe placed on the fat side while the NIRS probe was located on the skin side to measure the scattering/absorption in the fat layer. The average optical scattering was measured in 1-3 mm under the skin where the optical probe was located.

Results

Figure 3C:
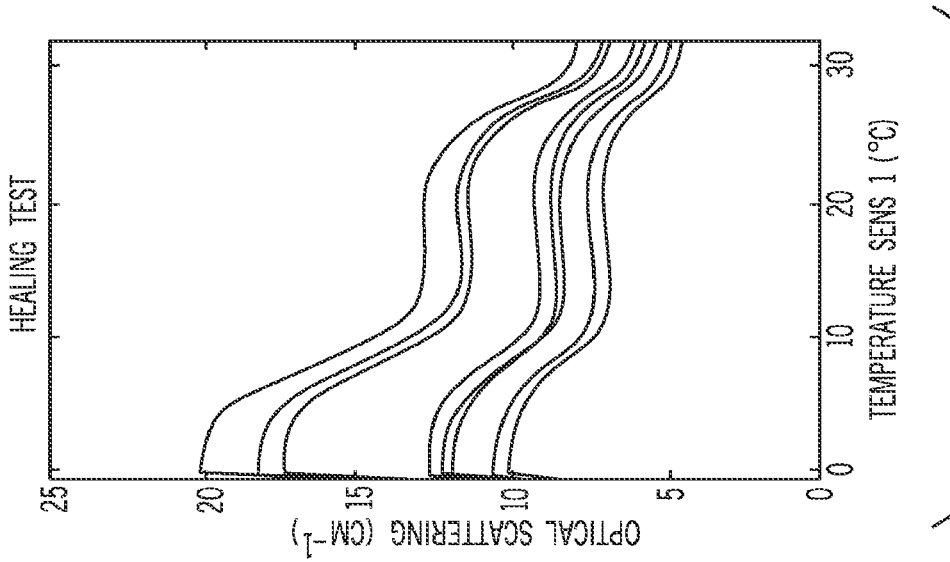
FIG. 3C is a graph comparing optical scattering versus temperature for multiple near-infrared wavelengths.
Figure 3B:
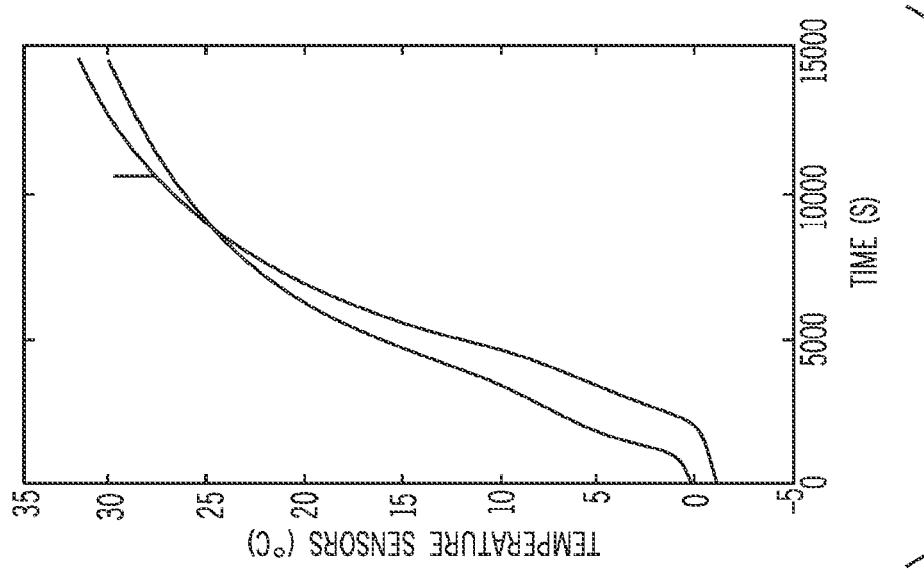
FIG. 3B is a graph showing temperature measurements as a function of time obtained from two locations in the fat tissue sample of FIG. 3A.
Figure 3A:
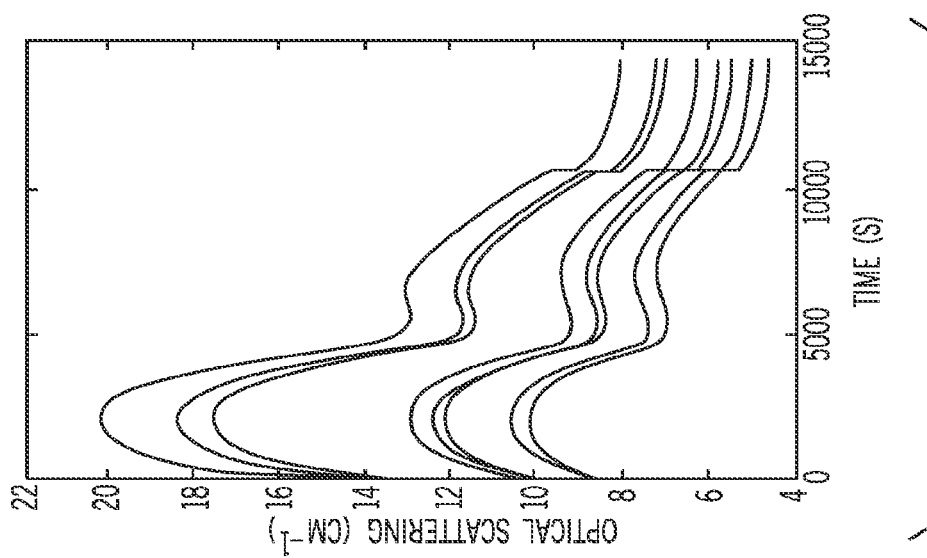
FIG. 3A is a graph showing optical scattering versus time for a fat tissue sample measured during heating using multiple near-infrared wavelengths, in accordance with aspects of the present disclosure.
Figure 4C:
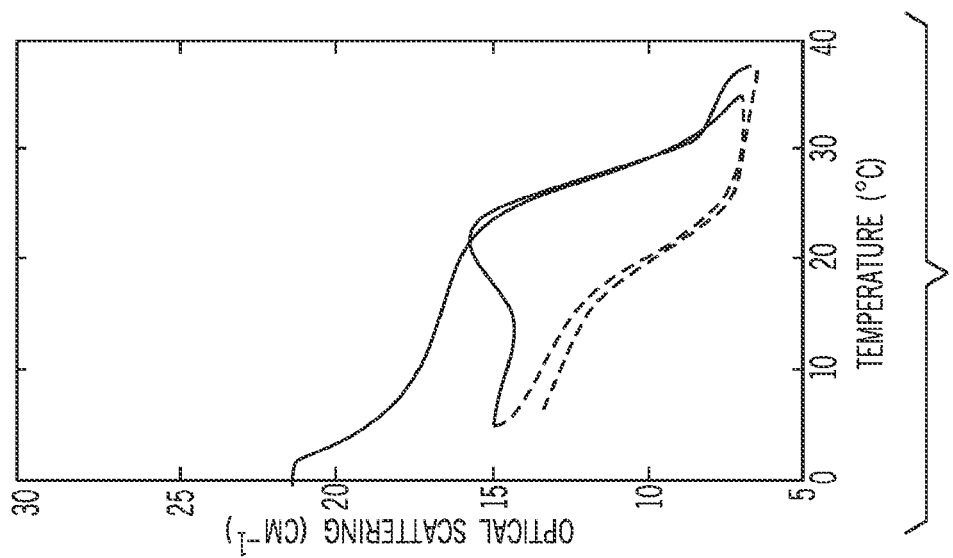
FIG. 4C is a graph comparing optical scattering versus temperature obtained of the fat tissue sample of FIG. 4A during heating and cooling cycles.
Figure 4B:
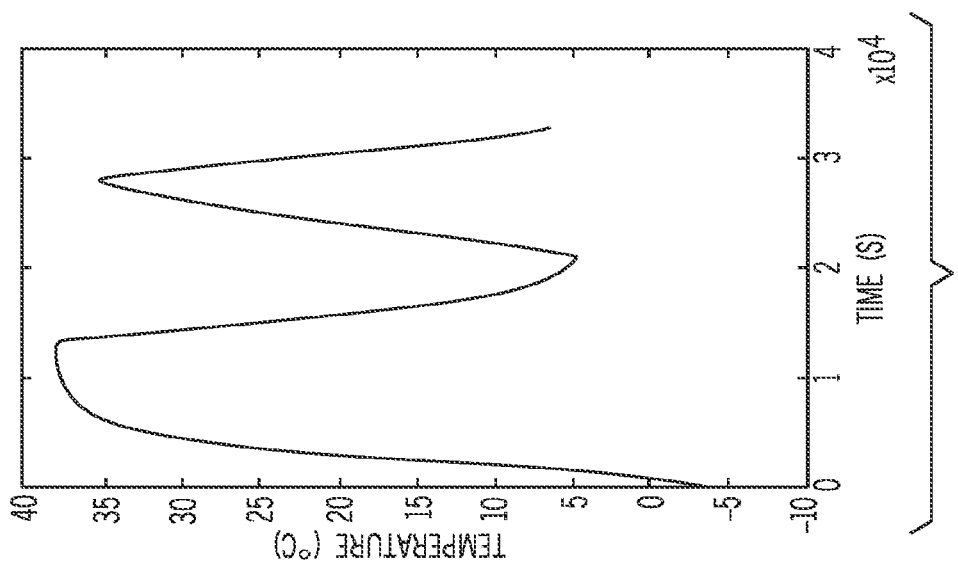
FIG. 4B is a graph showing temperature measurements as a function of time obtained from the fat tissue sample of FIG. 4A.
Figure 4A:
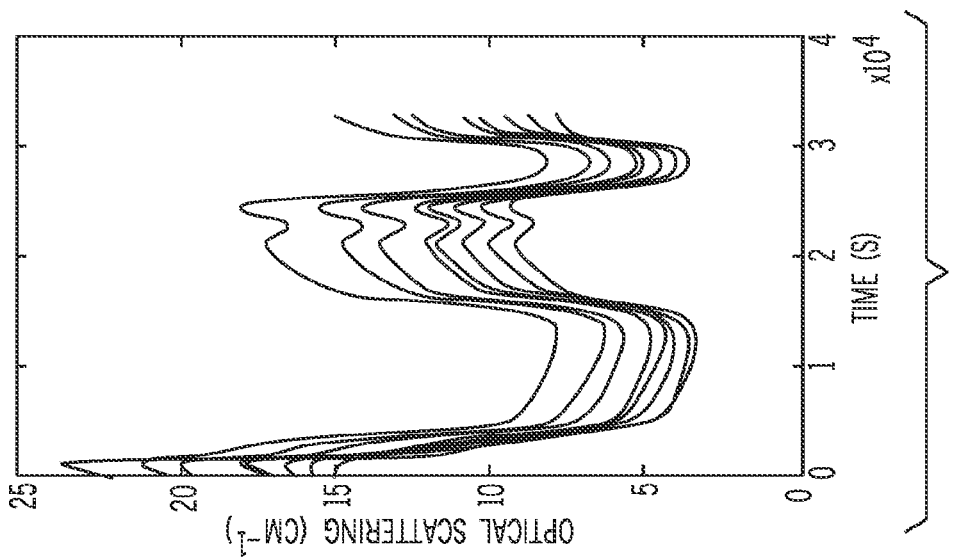
FIG. 4A is a graph showing optical scattering versus time, measured during temperature cycling, for a fat tissue sample using multiple near-infrared wavelengths, in accordance with aspects of the present disclosure.
Figure 5C:
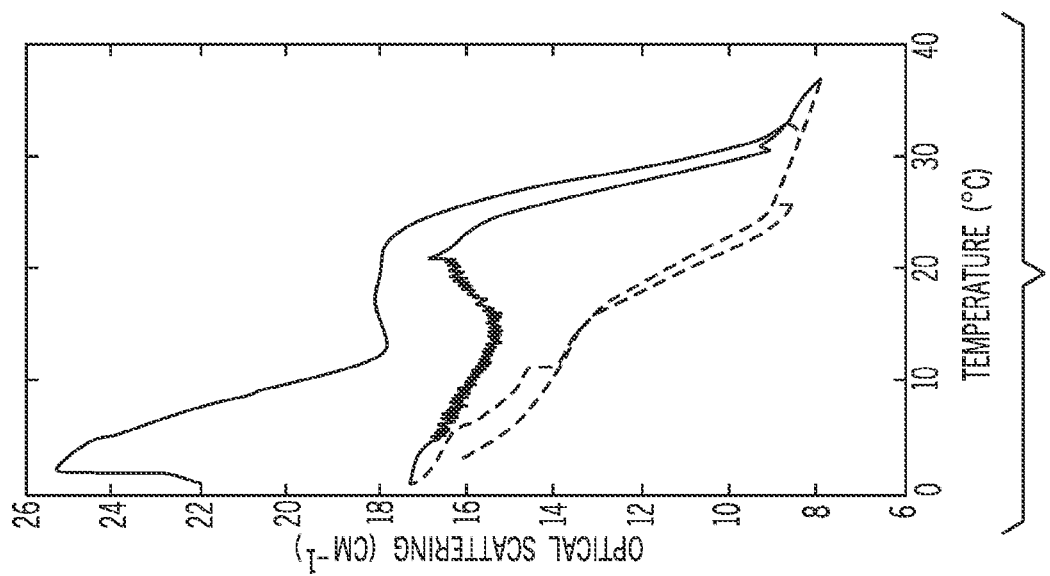
FIG. 5C is a graph comparing optical scattering versus temperature measured during heating and cooling cycles for the fat tissue sample of FIG. 5A.
Figure 5B:
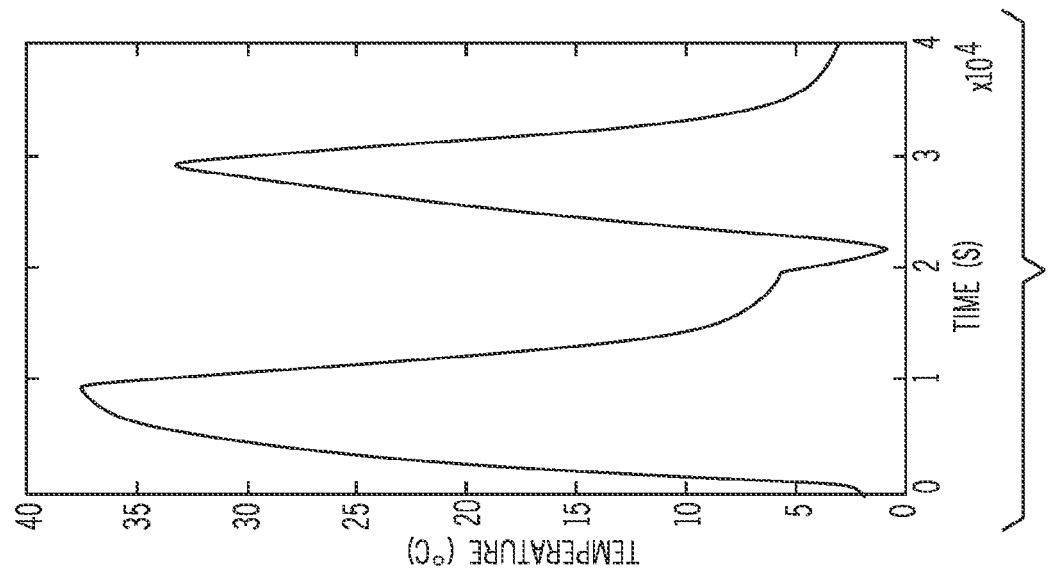
FIG. 5B is a graph showing temperature measurements as a function of time obtained from the fat tissue sample of FIG. 5A using multiple near-infrared wavelengths.
Figure 5A:
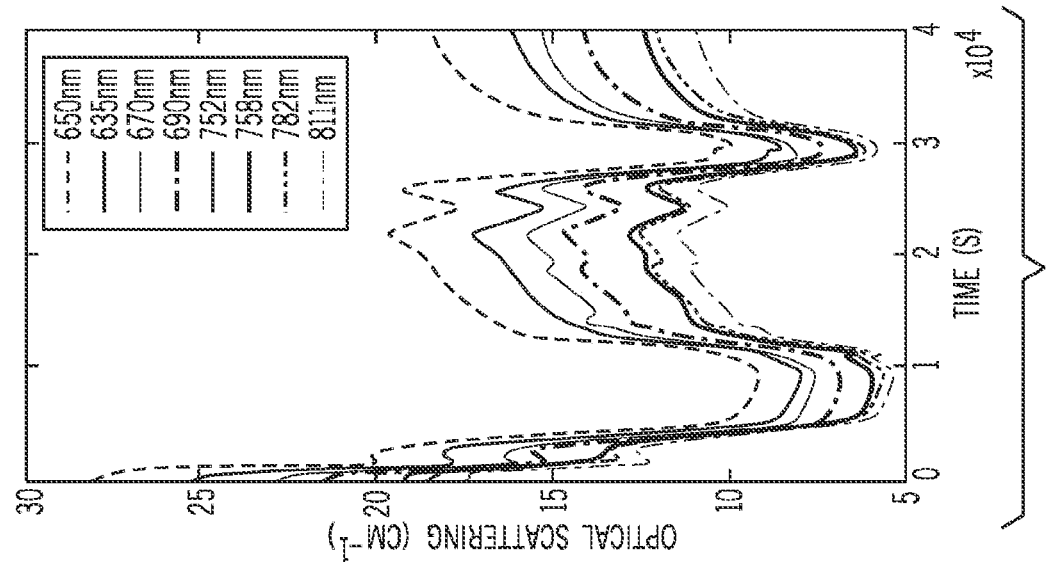
FIG. 5A is a graph showing optical scattering versus time, measured during temperature cycling, for another fat tissue sample, in accordance with aspects of the present disclosure.

Multiple measurements were performed on skin tissue with a thick subcutaneous fat layer while applying cyclic heating/cooling to the fat layer. The optical properties of multiple samples were calculated from the optical NIRS measurements. FIGS. 3A-3C results for the scattering and temperature vs. time. The sample shown was heated from approximately −1° C. to 30° C. In particular, FIG. 3A shows the optical scattering for 8 different wavelengths vs. time and FIG. 3B shows the temperature vs. time. As appreciated from the figures, optical scattering decreases with increasing temperature, and increases with decreasing temperature. The scattering data shows a peak in the slope when the sample temperature is close to 5° C. In FIG. 3C, the optical scattering data is plotted against the temperature. The data shows two plateaus between roughly 0-5° C. and 10-20° C. These data suggest that the slope of scattering coefficients are considerably changed between roughly 5-10° C. and 20-25° C.

FIGS. 4A-4C and 5A-5C show two different cases in which two cycles of heating and cooling are presented. The tissue was heated from approximately −2° C. to 37° C. and then cooled down to around 5° C. and then heated to around 35° C. and finally cooled down to 5° C. The results, again, show that optical scattering decreases when heating the tissue and increases during cooling. As appreciated from FIGS. 3-5, the dependence of scattering on temperature follows a similar course in both cases. This was confirmed in a total of six trials using three different samples.

Scattering vs. temperature graphs can show the temperature points when the phase transition happens. Distinct changes in the rate of change of the scattering were observed while the phase transition happened in measured fatty tissues. In particular, two transition regions were observed while heating, namely one around 5-10° C. and one around 20-27° C. On the other hand, one transition region about 17-23° C. was observed while cooling. This 6-7° C. hysteresis was observed during multiple heating/cooling cycles in several samples, as appreciated from FIGS. 4A-C and 5A-C. One likely explanation may involve the formation of different polymorphs of the fat crystals between cooling and heating cycles.

Figure 6A:
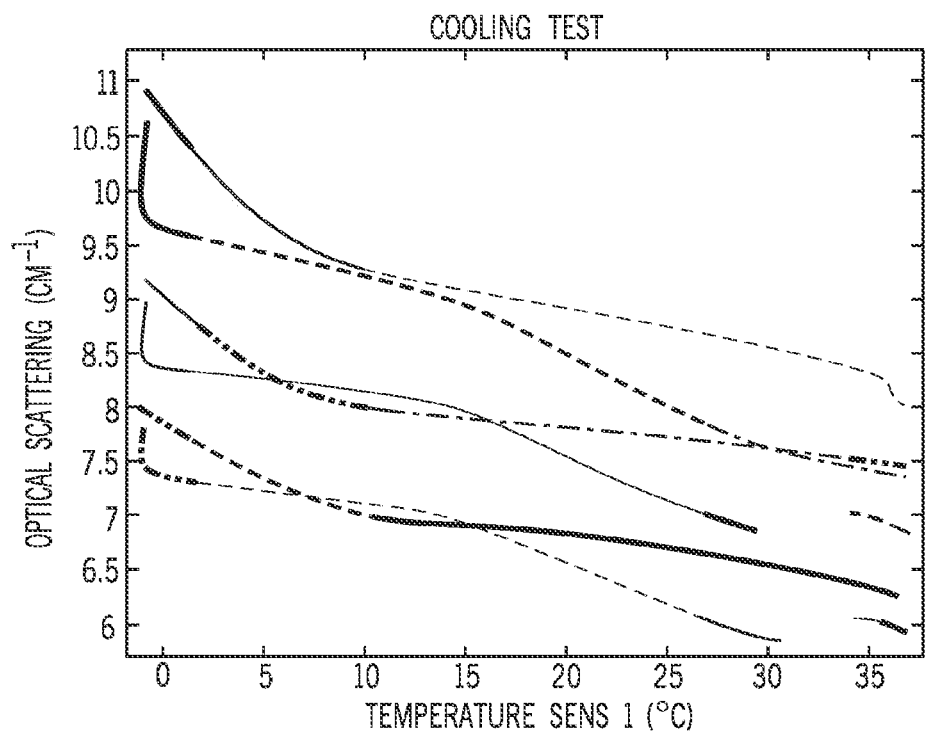
FIG. 6A is a graph showing optical scattering measurements versus temperature obtained from a sample of human skin with subcutaneous fatty tissue.
Figure 6B:
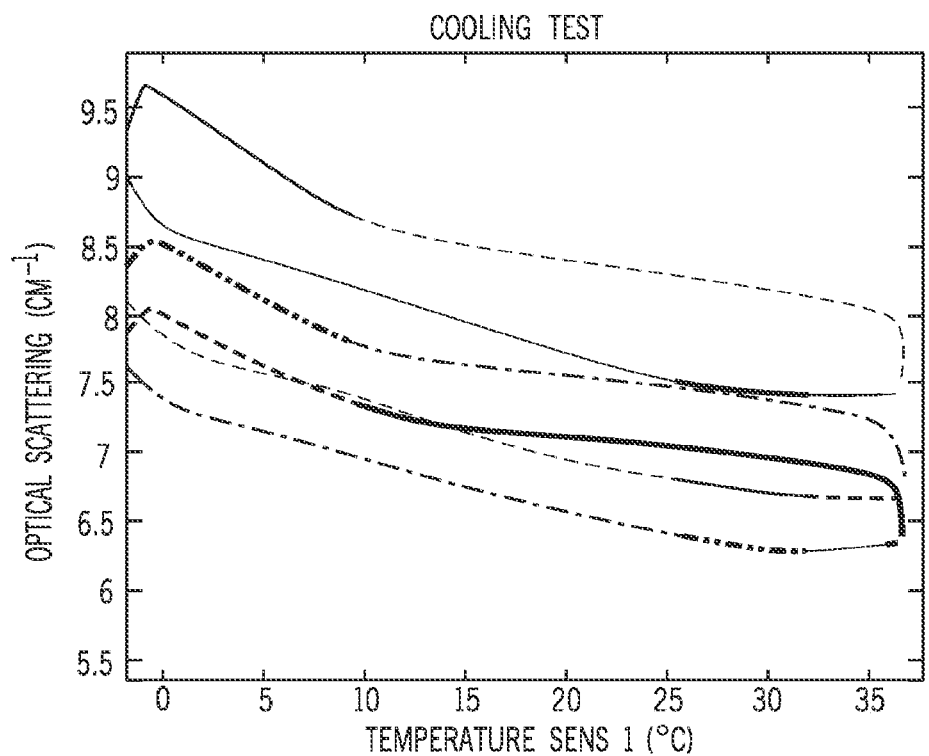
FIG. 6B is another graph showing optical scattering measurements versus temperature obtained from another sample of human skin with subcutaneous fatty tissue.
Figure 6C:
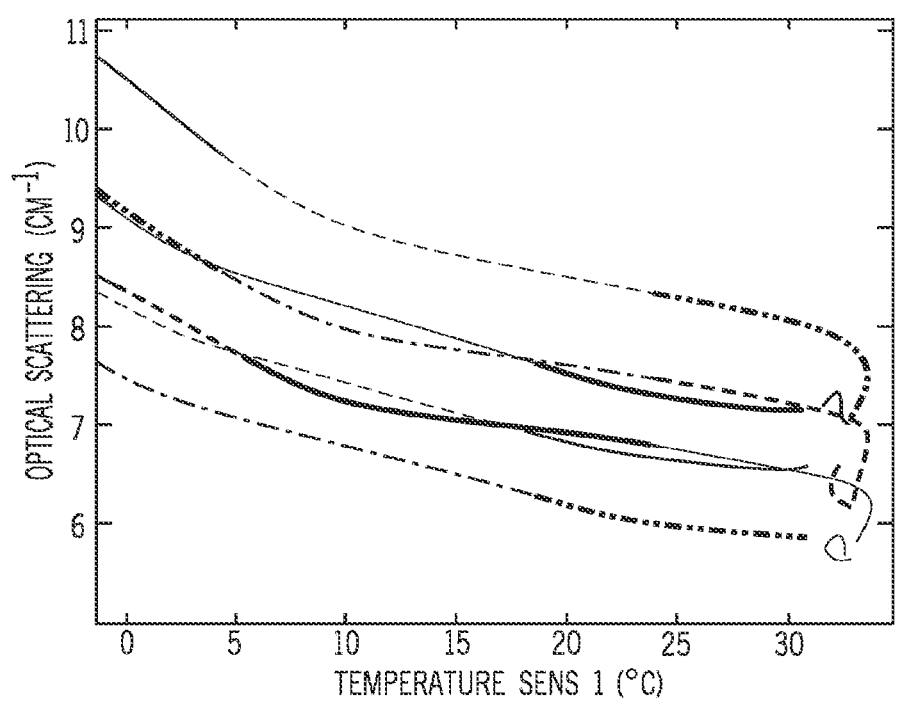
FIG. 6C is yet another graph showing optical scattering measurements versus temperature obtained from yet another sample of human skin with subcutaneous fatty tissue.

The present approach was also utilized to measure human tissue. Referring particularly to FIGS. 6A-6C, measurements of different samples of human skin with subcutaneous fatty tissue are shown. In particular, optical scattering was measured versus temperature, during multiple heating and cooling cycles. The results revealed similar features indicative of phase transitions, as described. As such, the present approach is relevant to animal as well as human applications.

Figure 7A:
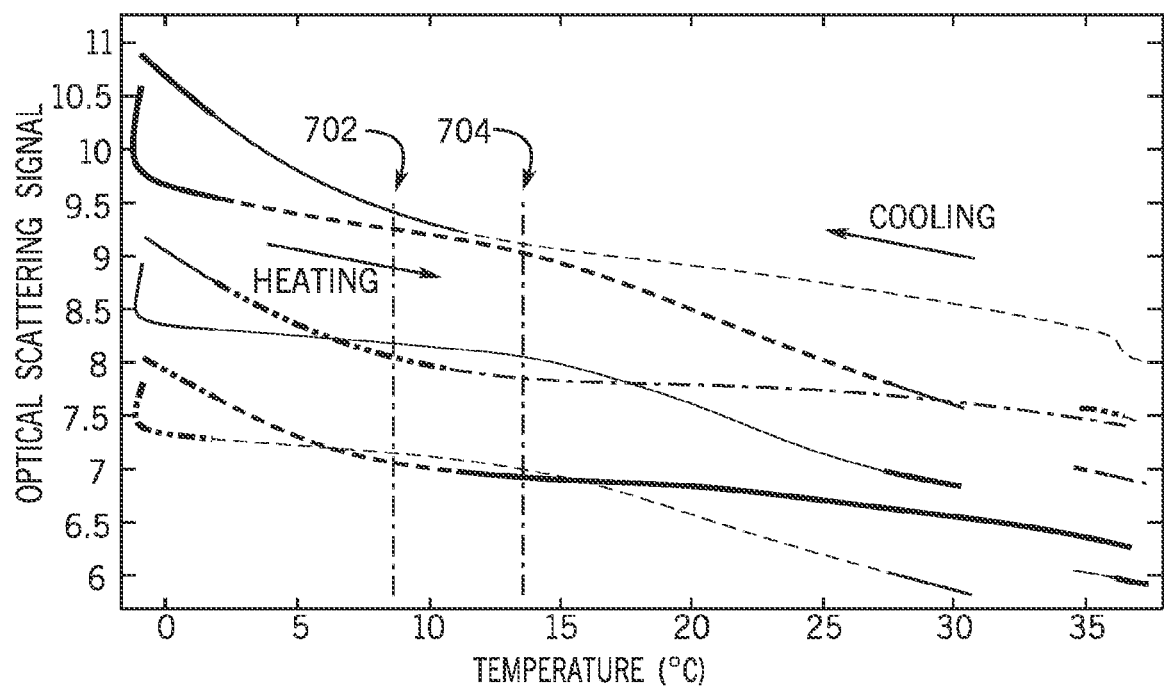
FIG. 7A is a graph showing non-invasive optical scattering measurements obtained from a fat sample over multiple thermal cycles, in accordance with aspects of the present disclosure.
Figure 7B:
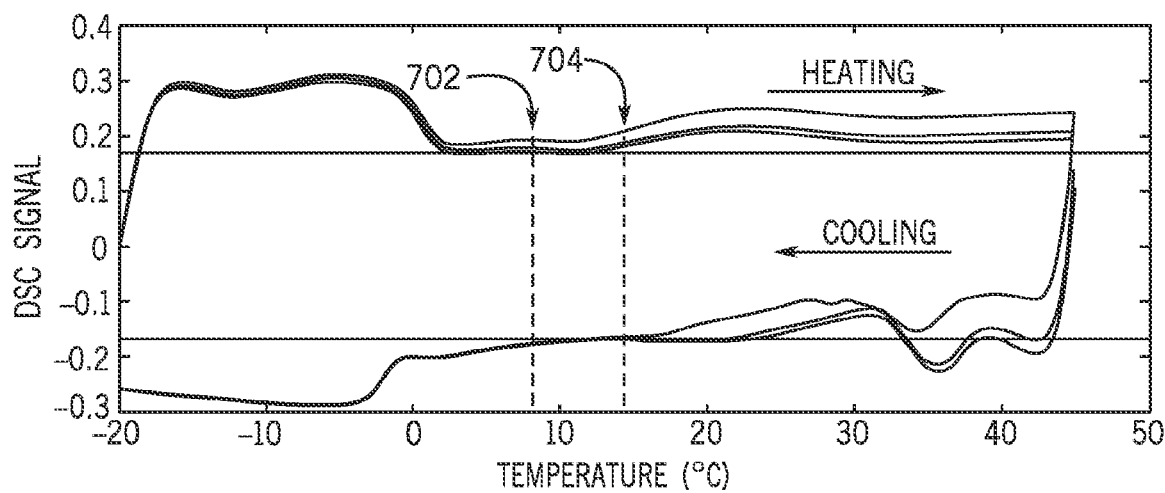
FIG. 7B is a graph showing differential scanning calorimetry ("DSC") measurements over multiple thermal cycles obtained from the same fat sample of FIG. 7A.

As a further example, FIGS. 7A and 7B show graphs that compare measurements of the same fat sample using the present optical scattering approach versus differential scanning calorimetry ("DSC"), respectively. In particular, DSC is a thermoanalytical technique that measures the amount of heat required to increase the temperature of a sample, as compared to a reference, and is commonly used as a gold standard for detecting phase transitions. As appreciated from the figures, matching inflexion points are observed over multiple thermal cycles using the present approach and DSC, as indicated by labels 702 and 704 in both FIGS. 7A and 7B. In particular, both FIGS. 7A and 7B show phase transitions in the cooling and heating cycles occurring approximately around 8° C. and 13° C., respectively. Although the amount of fat extracted for the DSC was small (about 10 milligrams), the phase transition temperatures shown by DSC were in good agreement with optical scattering measurements. These results demonstrate that the present approach can indeed measure non-invasively fat freezing/crystallization temperatures.

Conclusion

Results shown herein illustrate that the kinetics of phase change as a result of cooling and heating can be monitored using NIRS. Optical properties, such as optical scattering can be measured and correlated to the temperature. In this manner, phase changes of fat and other biological tissue can be detected as well as predicted. For instance, scattering changes versus temperature can be used to obtain phase transition points, and correlations can be derived and used to predict the transition points. The hysterics observed in the cooling/heating cycles could be due to the polymorphic crystallization or different kinds of crystal of the fat tissue at different temperatures.

EXAMPLE II

Selective Cryolipolysis (SC) is a non-invasive medical treatment to destroy fat cells by controlled use of cooling. Since SC was introduced, its safety and efficacy has been shown in several studies and is spreading quickly around the world. In principle, controlled cooling of fat tissue causes non-invasive localized reduction of the fat deposits. In SC, a vacuum is produced to encompass the adipose tissue and reduce the local blood pressure, while cooling is applied to the adipose tissue to lower the intra-adiposity temperature. This is thought to cause cellular changes to an extent that generates therapeutic results without damaging other structures. It is recognized herein that formation of lipid crystals (fat freezing) may play an essential role in inducing a localized destruction of fat deposits.

Currently SC is performed with area- and applicator-specific preset treatment settings (time, cooling rate, and preset temperature). Although clinical studies have generally demonstrated the efficacy of cryolipolysis for subcutaneous fat removal, the exact mechanism of action for cryolipolysis is not yet completely understood. Studies have shown that multiple additional pre/post treatment options such as massage can enhance the efficacy of outcomes.

Although cryolipolysis has been proven to be effective for removal of subcutaneous fat, it is recognized herein that real-time monitoring of onset and distribution of fat freezing can improve the dosimetry of the treatment and further minimize any variation of treatment efficacy. Understanding the onset of changes in the morphology of the fat tissue during cooling and the kinetics of fat phase changes at different temperatures can help in investigating the mechanism of fat cell removal. For example, it was proposed that phase changes that occur could involve lipid crystallization or lipid-to-gel phase transitions. However, currently there are no non-invasive technique to monitor such changes or transitions, even in vitro.

Moreover, the composition of fatty acids, whether saturated or non-saturated, undergoes crystallization at different temperatures. Varying the exposure times have been shown to affect the crystallization process. For example, samples exposed to 8° C. for 25 min have larger crystal size compared to the samples exposed for 10 min. The variation in amount of unsaturated fat between patients and the fact that mono and poly saturated fatty acids have different liquid-to-gel transition points indicate that each patient experiences different crystallization kinetics during cryo-procedures. Thus, monitoring the kinetics of such changes, particular to each individual patient, can help enhancing the treatment outcome.

In this work, the onset and evolution of phase changes in subcutaneous fatty tissue was investigated during the cooling/heating using Near-Infrared Spectroscopy (NIRS). Changes in optical properties (such as the scattering, $\mu_s$, coefficient), which can be measured using NIRS, can reveal changes in the morphology of the tissue during the cooling procedure. The Optical Scattering (OS) measurements were compared to Differential Scanning calorimetry (DSC), which is the gold standard for monitoring phase transitions. For some samples, Magnetic Resonance Imaging (MRI), Spectroscopy (MRS) measurements and Optical Coherence Tomography measurements were performed.

In particular, concurrent in vitro measurements of optical scattering during a cooling/heating cycles were obtained from NIRS and MR signal parameters ($T_2^*$) as well as spectral parameters from MR Spectroscopy (MRS) performed in a 3T MR scanner. Also, to further investigate phase transitions in adipose tissue in microscopic level, an identical cooling/heating procedure was replicated on a small piece of fat harvested from the same tissue while being imaged under Optical Coherence Tomography (OCT). The temperature relationships of optical scattering, $T_2^*$/MRS characteristics and OCT intensity/attenuation were analyzed to find signatures related to the onset of phase transition. For all methods, temperature showed inflexions in a narrow range, which are characteristic of lipid phase transition. Results shown herein demonstrate that NIRS can be used in to improve dosimetry, minimizing the variation in clinical outcomes for SC or other cryo-procedures.

Materials and Methods
Tissue Samples

Two human skin specimens with a thick subcutaneous fatty layer were harvested from the byproducts of abdominoplasty procedures (fat layer thickness 1.5-3 cm). The first was further divided in 4 pieces, while the second, smaller specimen was divided into two halves. The tissues were kept in a 4° C. refrigerator or a −20° C. freezer (if longer storage was needed) prior to being measured. Before the measurement session, samples were rewarmed to body-like temperature (between 37-40° C.) for at least 30 minutes, and were wrapped in thin transparent plastic foil for easier manipulation.

Cooling/Heating Process

Two water/antifreeze operated heaters/chillers were utilized to deliver heating/cooling inputs, namely a Julabo FL-601 (Julabo USA, Inc.) and a Stryker Gaymar TP700 (Stryker, Inc.). The higher capacity Julabo unit was used as the cold source (set to about −10° C.), while the Stryker was used as the warm source (set to about 42° C.). The switching was accomplished using a system of valves that allowed both devices to circulate continuously while selecting one at a time into the cooling/heating pad circuit. This was done to accelerate cycling time by avoiding the need for the large thermal mass of the operating fluid to vary between the low and the high temperature setting.

Figure 8A:
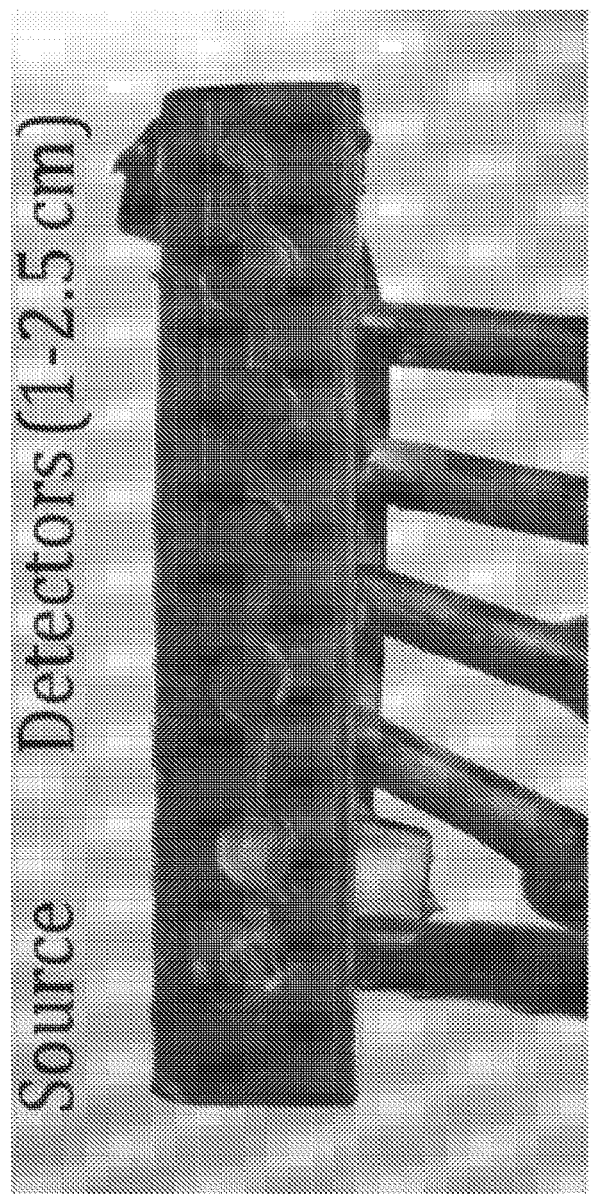
FIG. 8A is a photograph of an example probe for an optical system based on near-infrared spectroscopy ("NIRS"), in accordance with aspects of the present disclosure.
Figure 8C:
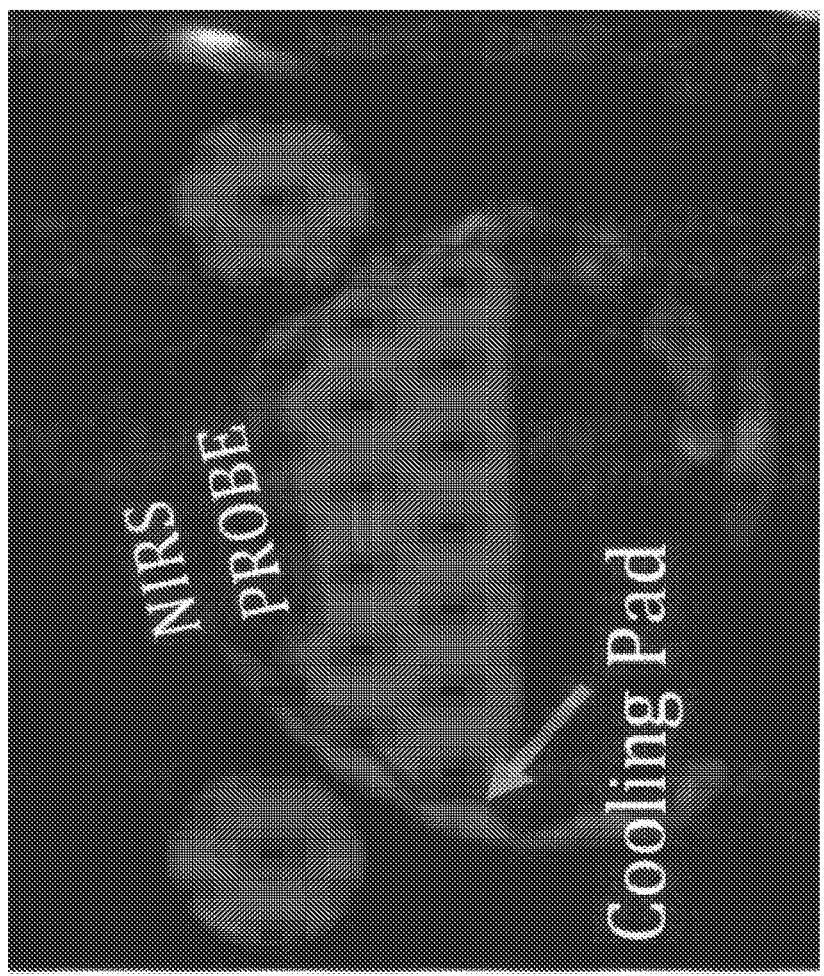
FIG. 8C is a T1-weighted magnetic resonance ("MR") image showing the location of a sample, a cooling pad and NIRS probe for the simultaneous NIRS-MR measurement.

Cooling/heating was applied using a flexible pad wrapped around the sample (Cold Rush, Ossur Inc.). The thermal pad encompassed the tissue such that it cooled/heated the surface of the sample. In order to ensure that heat exchange occurred primarily from the surface of the skin, an isolating material was placed underneath the tissue, between the fat and the thermal pad. A NIRS probe (FIG. 8A) was positioned on the skin through an opening cut in inactive area of the cooling and was used to measure the optical properties of the adipose tissue. The internal temperature inside the sample was monitored using two fiber optic temperature probes attached to a Neoptix Reflex head unit (Qualitrol Inc.) that offered logging over RS-232. FIG. 8C shows an MRI image and schematic of the experimental set-up. The arrangements were similar for off-MRI experiments.

Each sample was first heated to body-like temperatures (about 37 to 40° C.) using a hot plate, as described above. Then, water circulation was established through the cooling/heating pad using the Stryker device set to about 42° C. After approximately 10 minutes of baseline, the circulation was switched to the Julabo device set to about −10° C. until the sample internal temperature (as reported by the fiber optic thermometer) approached 0° C. At that point, the circulation was switched back to Stryker device for warming, and measurements continued until the sample internal temperature reached at least 35° C.

Near Infrared Spectroscopy

An ISS Imagent Frequency Domain Spectrometer (ISS Inc.) operating at a modulation frequency of 110 MHz was utilized. The instrument included eight time-shared laser diodes per source bank and four photomultiplier tube detectors. The laser diodes provided light signals with wavelengths approximately between 635 and 830 nm. A customized probe (FIG. 8A) having 3 co-localized 400 micron optical fibers was used to deliver 690, 782 and 830 nm light at one location. The probe also included 4 fiber bundles (2.5 mm) to collect the diffusely reflected light at distances of 1, 1.5, 2 and 2.5 cm from the source location, respectively. The distance range was chosen to provide sensitivity to the sub-cutaneous fat layer. As an example, FIG. 8B shows an illustration of sensitivity profiles for an example measurement and their spatial relationship to the skin and subcutaneous fat layers.

The probe was inserted through a cut in the center of the cooling pad and was in direct contact with the skin side of the sample. Tissue optical properties (absorption, $\mu_a$, and scattering, $\mu_s$, coefficients) were derived from measurements at the multiple source-detector separations using a multi-distance approach, in conjunction with calibration measurements taken using a reference block.

Magnetic Resonance Imaging and Spectroscopy

Scans were performed using a Siemens Prisma 3T MRI scanner and a 64 channel head coil. The sample was wrapped in the cooling/heating pad, the NIRS probe and fiber optic temperature sensors were inserted, and the assembly was placed on a custom-built low thermal conductance platform that ensured the tissue was close to the center of the MR coil. Several foam blocks were used to immobilize the sample assembly. Both optical fibers (NIRS and temperature sensing) as well as the cooling/heating hoses were routed through access ports and the instruments/temperature cycling devices were placed in the MR scanner instrumentation room.

For each sample, a 3D-FLASH T1-weighted structural scan was acquired to visualize the contact between the fluid pad and the sample, as well as proper positioning of the NIRS and temperature probes (see FIG. 1c). Then, a slice location was selected in the area approximately under the NIRS probe, and was imaged repeatedly using a 2D T1-weighted multi-echo gradient echo sequence) (TR/TE/

FA=150 ms/2.9-30 ms/70°). Single voxel spectroscopy (SVS) data was also acquired in an interleaved fashion with the 2D GRE images, using a PRESS sequence with a TE of 30 ms. The SVS voxel was placed near the fiber optic temperature sensors, approximately in the area probed by the NIRS measurement. Both MR sequences were repeated for as long as needed to complete the cooling/heating cycle.

Acquired multi-echo data was then fit to an exponential decay to obtain the T2* relaxation time. Its value was computed over time in a region-of-interest defined to approximately coincide with the area probed by NIRS. The MR spectroscopy spectra were fit using Lorentzian curves to obtain the peak location, height, full-width at half-max and peak area. A typical MR spectrum of fatty tissue measured by clinical field strengths has six distinct fat peaks although the peaks 1 and 2 cannot be clearly distinguished from water. This analysis focused on the methylene peak at approximately 1.3 ppm.

Optical Coherence Tomography

To investigate the microscopic behavior of fatty tissue during cooling/heating, small (~1.5 mm$^3$) pieces of the subcutaneous fat were cut off the tissue samples prior to bulk temperature cycling. These samples were imaged using a Thorlabs Telesto 1300 nm spectral domain OCT system. Each sample was positioned on a thermoelectrically cooled/heated platform and imaged as the temperature was varied according to the recorded temperature time-course from the bulk tissue measurements. The temperature was monitored using an Omega thin-wire thermocouple. Averaged B-scan images were acquired every second for the duration of the temperature playback. OCT frames were then analyzed both by averaging the image intensity over areas equidistant from the cooling surface, and by computing the attenuation coefficient from the laterally averaged intensity profile of each B-scan.

Differential Scanning Calorimetry

Several small pieces were harvested from each tissue sample, and were sent on dry ice to an outside service (Netzsch Instruments, Burlington, Mass.) for characterization using Differential Scanning calorimetry. Measurements were performed using a Netzsch DCS 214 Polyma device. Three cooling/heating cycles were performed from approximately 45° C. to −20° C. and back to 45° C. at 5° C. per minute, using approximately 10 mg of fatty tissue sample while recording the energy flow to/from the sample.

Results

Figure 9A:
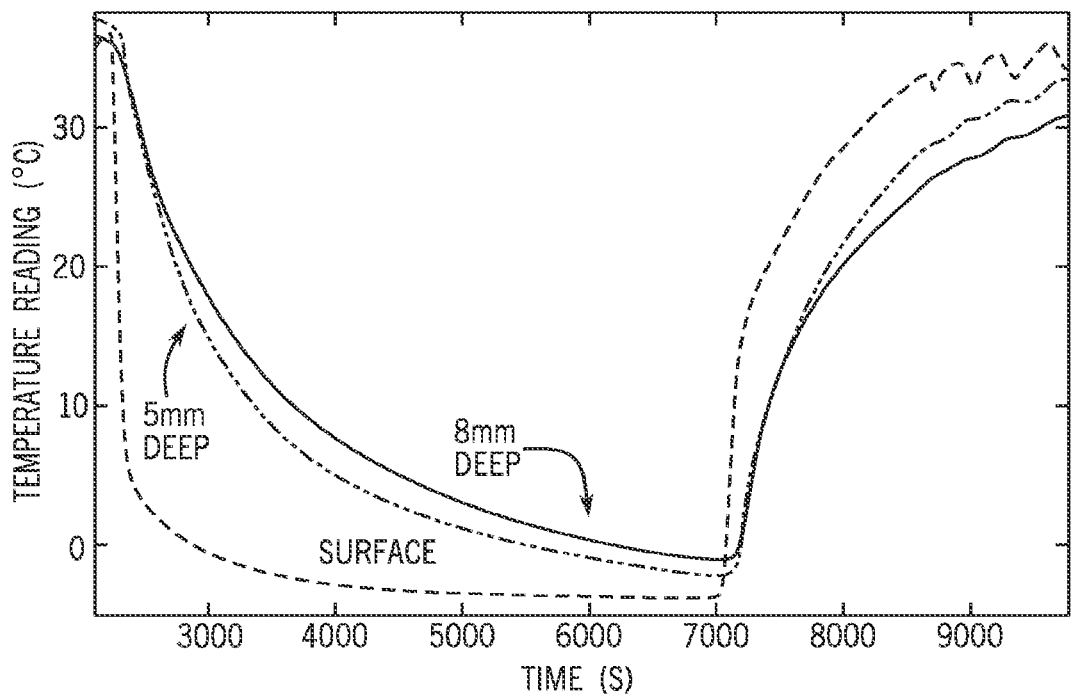
FIG. 9A is a graph showing an example temperature treatment timelines during a cooling/heating cycle, in accordance with aspects of the present disclosure.
Figure 9B:
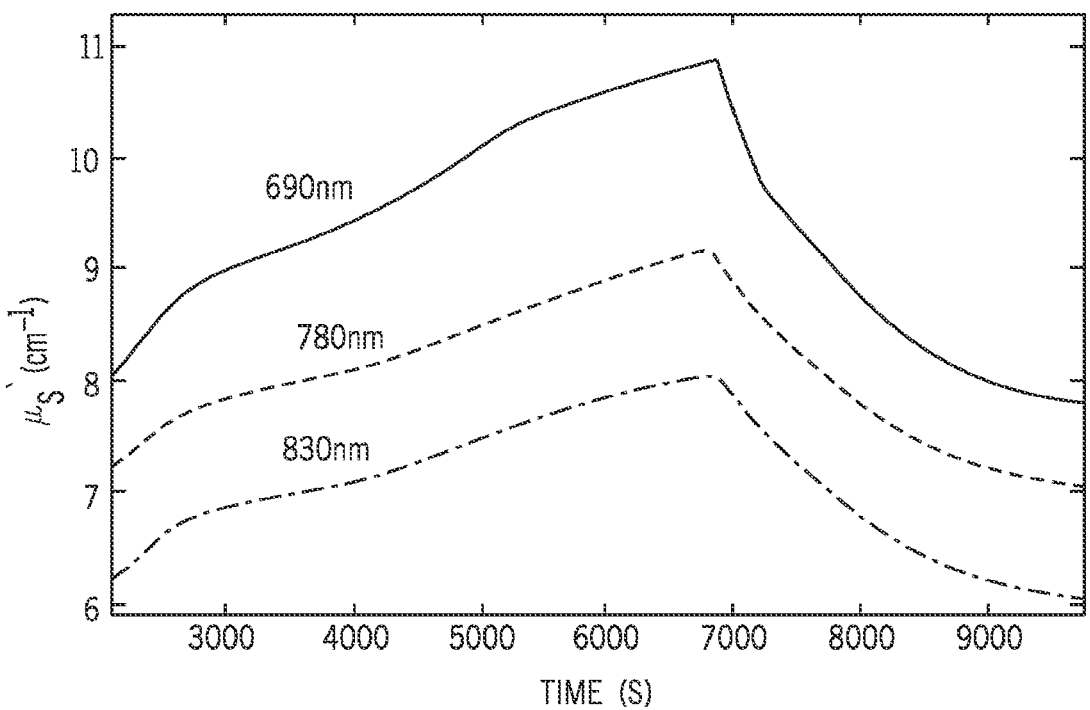
FIG. 9B is a graph showing example optical scattering measurements using multiple wavelengths during cooling, in accordance with aspects of the present disclosure.
Figure 9C:
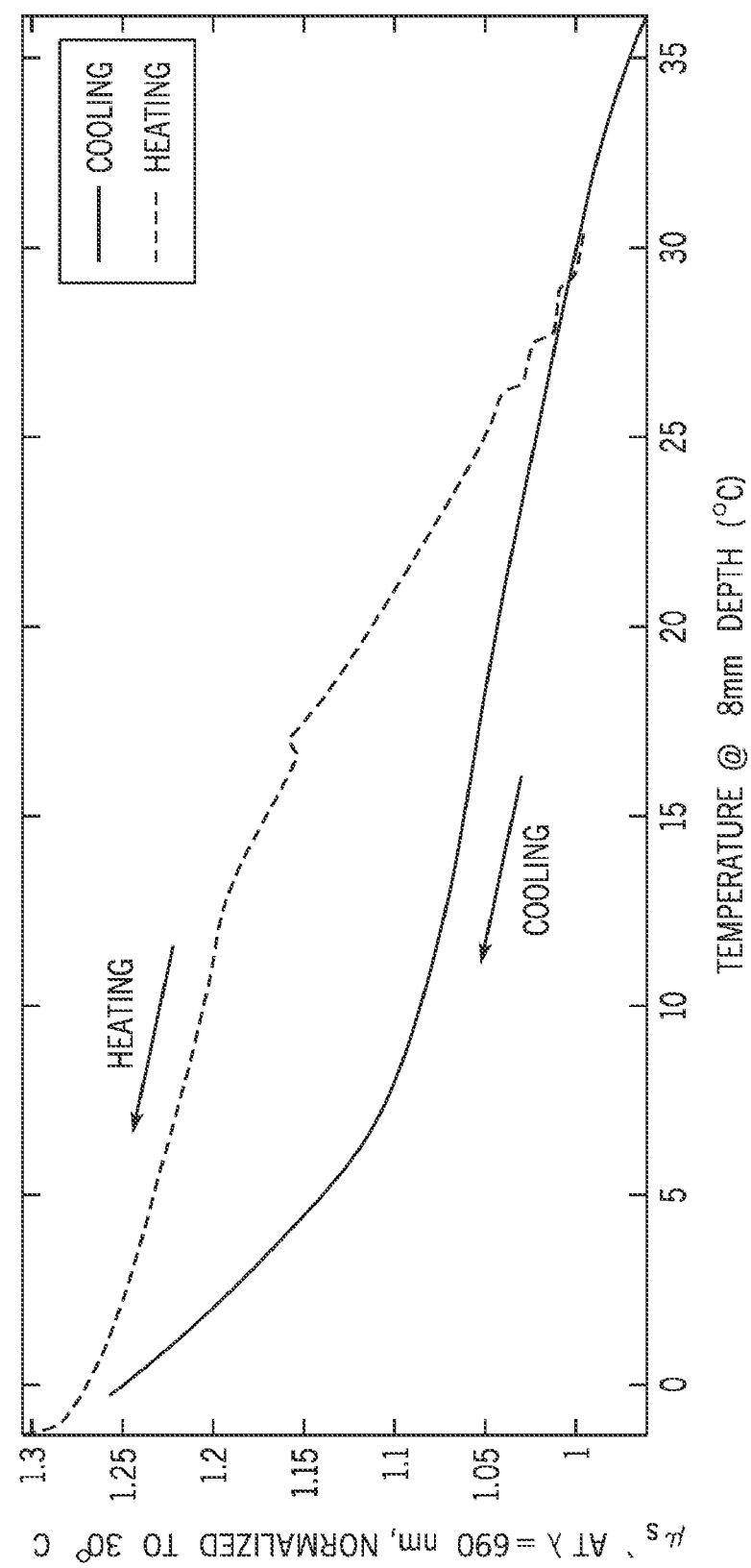
FIG. 9C is a graph showing example optical scattering versus temperature measurements, in accordance with aspects of the present disclosure.

FIGS. 9A-9C shows example of scattering measurements during a cooling/heating cycle. Specifically, FIG. 9A shows the temperature at the surface and at two different depths in the tissue. The pad (surface) temperature (blue) was initially 36° C., quickly brought down to below 0, then heated up to 35° C. once the tissue temperature reached approximately 0° C. The two internal thermal probes (red, orange) show similar temperature profiles, reflecting the delayed propagation of the cooling front inside the tissue. The 1st probe was inserted approximately 2 mm deeper than the second and thus the cooling was slightly slower and less deep.

The variation in scattering coefficient values over time at three different wavelengths are shown in FIG. 9B. Optical scattering increases with decreasing temperature and decreases with increasing temperature. The similarity in the behavior at the three wavelengths suggests that one wavelength might be sufficient for effective tissue monitoring. FIG. 9C displays the direct relationship of scattering with temperature at 690 nm during cooling (blue line) and heating (red line). During the cooling trace (blue) the optical scattering progressively increases, but the increase substantially accelerates once the sample goes under approximately 10° C. During the heating cycle (red), the scattering progressively decreases, but the decrease sharply accelerates once the sample heats beyond approximately 14° C.

As mentioned, DSC is considered to be the gold standard method for measuring phase transitions in the tissue. FIGS. 10A-C show differential scanning calorimetry data for a small portion of the tissue sample harvested from the subcutaneous fat layer, with whose optical measurements are show in FIGS. 9A-C. While several features were observed over the entire temperature range probed, an increase in the apparent heat capacity is seen below approximately 10° C. degrees during the cooling (FIG. 10C) and above 15° C. during the heating (FIG. 10B), indicative of a potential phase transition in the fatty tissue.

Figure 11A:
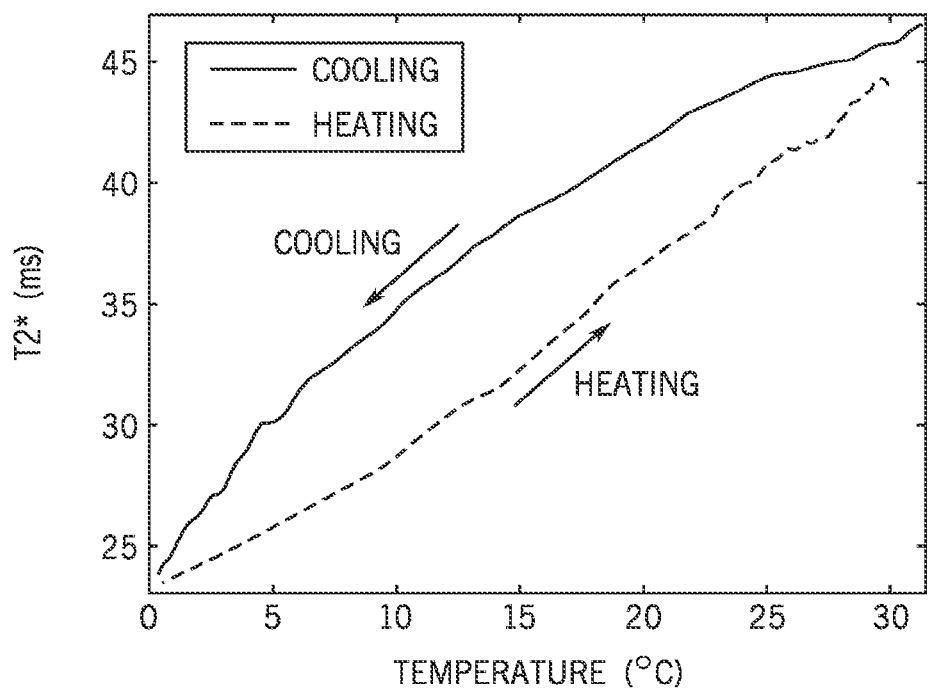
FIG. 11A is a graph showing MR T2* dependence on temperature obtained during cooling (blue) and heating (red).
Figure 11B:
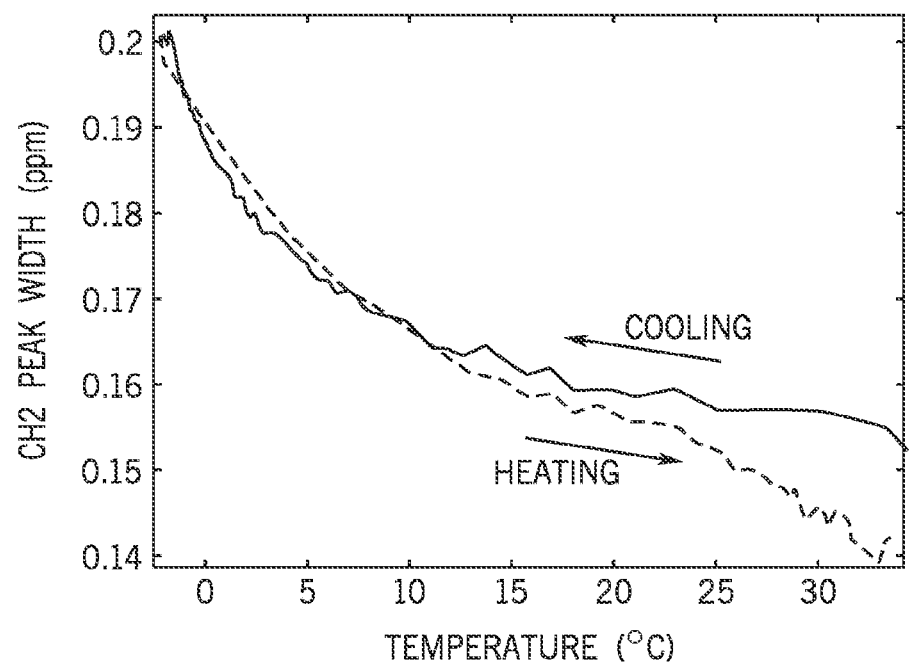
FIG. 11B is a graph showing Methylene (—CH2—) peak width in ppm as a function of temperature for a tissue sample obtained during cooling and heating.

FIGS. 11A-11B show MR based data acquired on the same sample. Specifically, FIG. 11A displays the changes in the T2* relaxation time with temperature—a slow decrease is seen during cooling that accelerates once the sample passes approximately between 7° C. and 9° C.; during heating the T2* progressively increases, and the increase appears to slightly accelerate once the tissue is heated beyond approximately 13° C. The fat spectrum acquired using MR single voxel spectroscopy shows broadening of multiple fat peaks. FIG. 11B displays the width of the —CH$_2$— (methylene) peak obtained by fitting the MR spectroscopy data. The evolution during heating and cooling is nearly identical, and there is no distinctive inflexion in the temperature relationship.

Figure 12C:
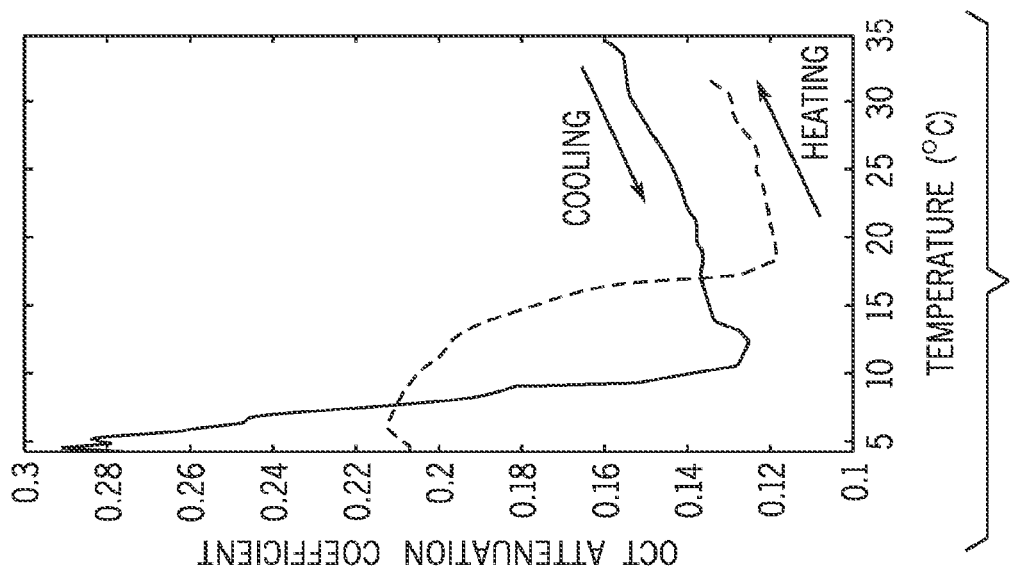
FIG. 12C is a graph showing OCT attenuation coefficient averaged over the horizontal dimension of the image in FIG. 12A.
Figure 12B:
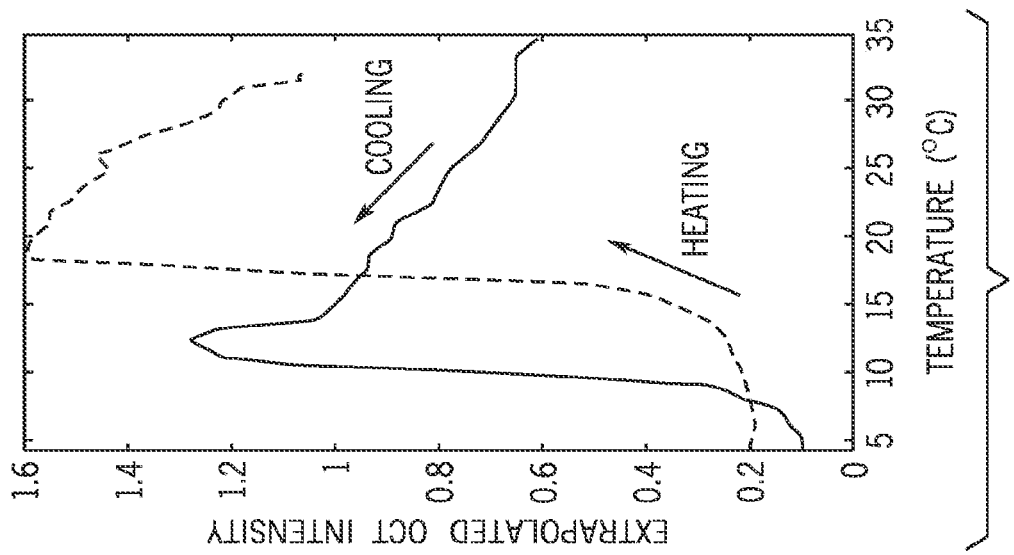
FIG. 12B is a graph showing an extrapolated signal intensity averaged over the horizontal dimension of the image in FIG. 12A.
Figure 12A:
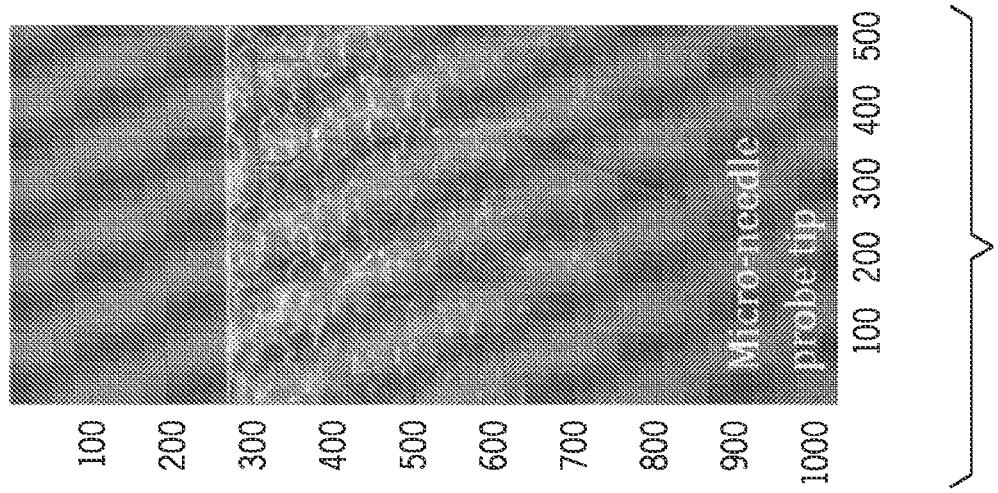
FIG. 12A is a B-Scan image cellular structure of a sample obtained using Optical Coherence Tomography ("OCT").
Figure 13A:
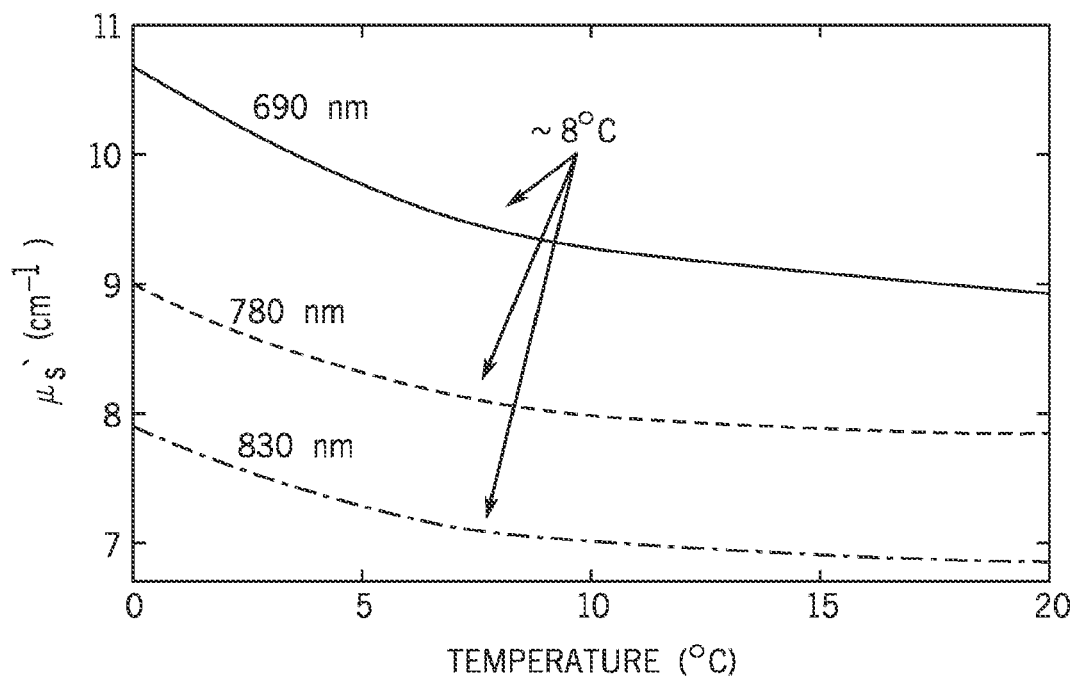
FIG. 13A is a graph showing example optical scattering measurements obtained from a sample of abdominal human skin with thick subcutaneous fatty tissue using multiple wavelengths, in accordance with aspects of the present disclosure.
Figure 13B:
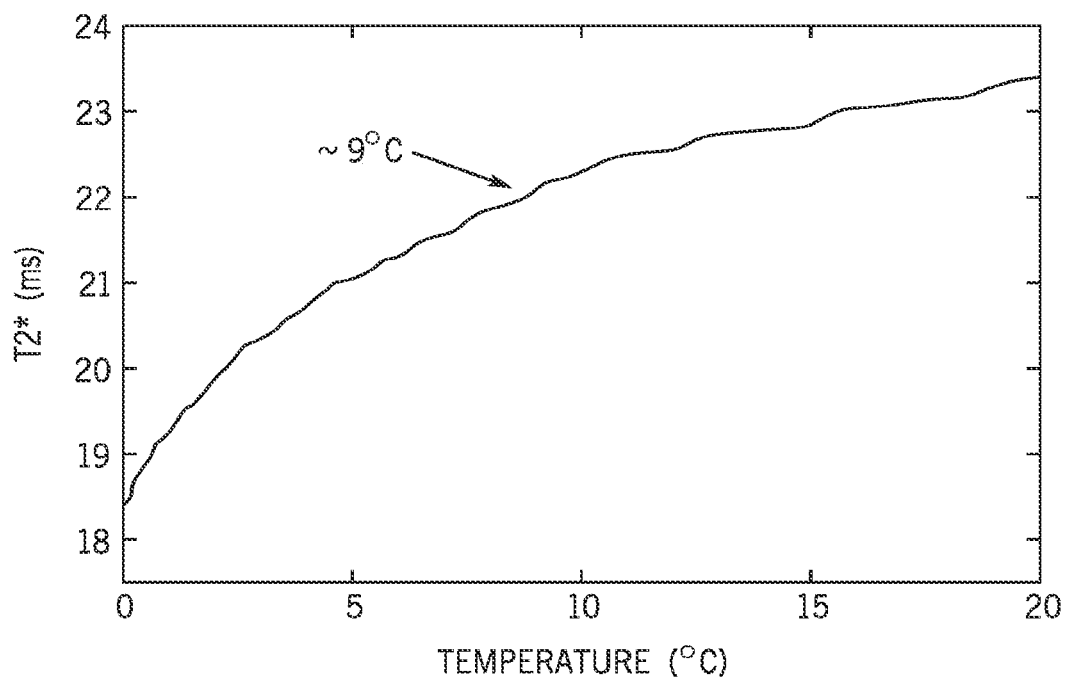
FIG. 13B is a graph showing MR T2* measurements corresponding to the measurements in FIG. 13A.
Figure 13C:
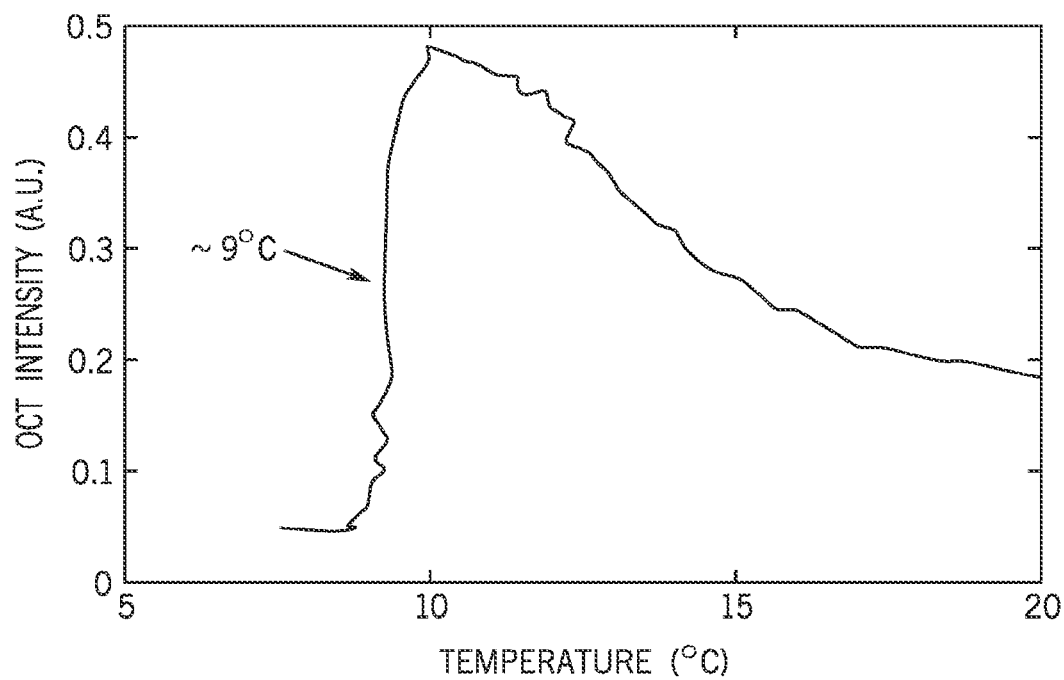
FIG. 13C is a graph showing OCT measurements corresponding to the measurements in FIG. 13A.
Figure 13D:
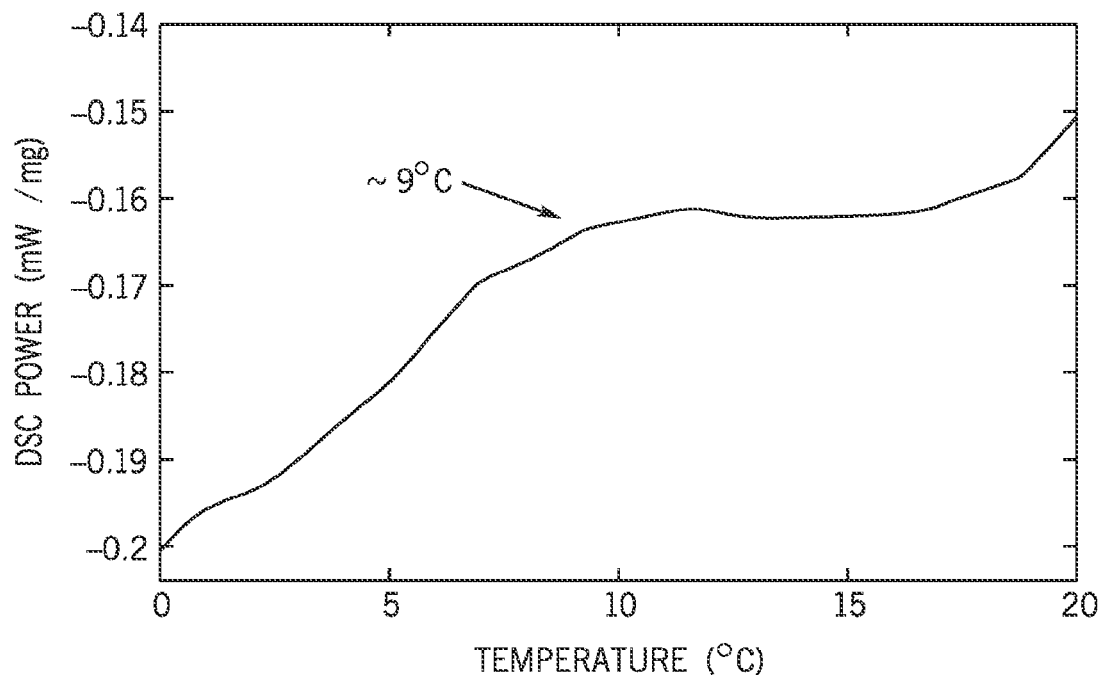
FIG. 13D is a graph showing DSC measurements corresponding to the measurements in FIG. 13A.

Optical Coherence Tomography (OCT) was further utilized to study the microscale phase transition. FIGS. 12A-12C show an OCT measurement conducted on a small (1 mm) piece of fat from the same sample reported above (with measurements shown in FIGS. 9A-9C), which was harvested prior to the bulk tissue measurements. The sample was thermally cycled using the temperature profile recorded during the measurements reported in FIGS. 9A-9C and truncated to 4° C. Specifically, FIG. 12A shows an example B-Scan image revealing the cellular structure of the sample. The image was then averaged horizontally at each frame and compressed into a single decay profile. This profile was fit with an exponential model, and FIG. 12B shows the extrapolated surface signal intensity from this fit, while FIG. 12C shows the effective attenuation coefficient of the OCT signal intensity vs. depth. As appreciated from the figures, as the sample cooled (blue trace), there was a sudden drop in signal intensity when the temperature decrease below about 10° C., accompanied by a similarly sharp increase in attenuation. The behavior reversed as the sample was reheated past about 15-16° C., observing a sharp increase in signal and an associated decrease in attenuation.

To evaluate the degree of agreement between the different measurements methods, a comparison of OS, OCT, MRT2* and DSC from an abdominal human sub-cutaneous fatty tissue is shown in FIGS. 13A-13D. All the measurements consistently showed a cooling phase transition in this sample occurring around 9° C., as indicated by the arrows in FIGS. 13A-13D.

Figure 14A:
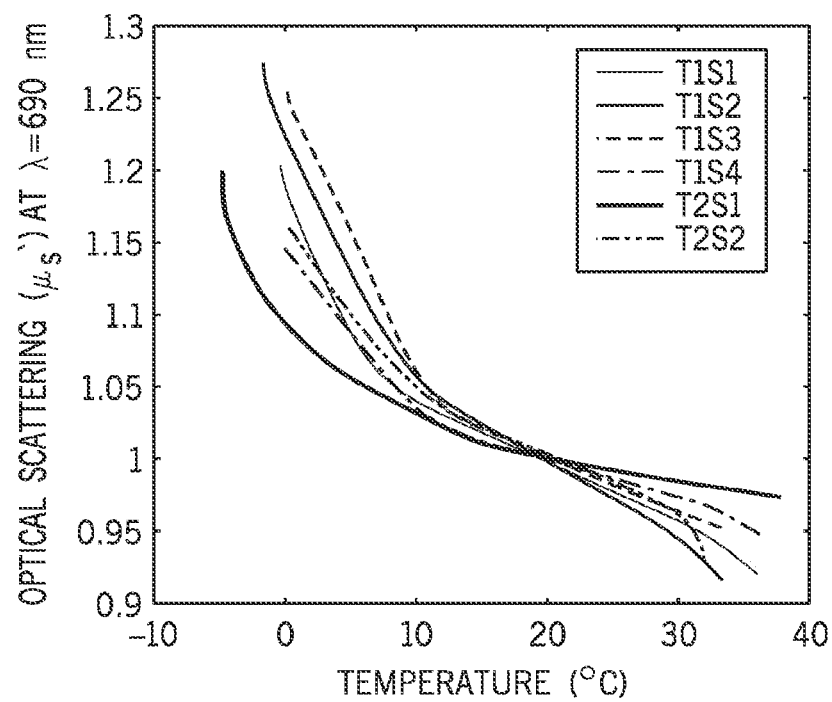
FIG. 14A is a graph showing example optical scattering measurements for multiple samples normalized to the scattering coefficient at 20° C.
Figure 14B:
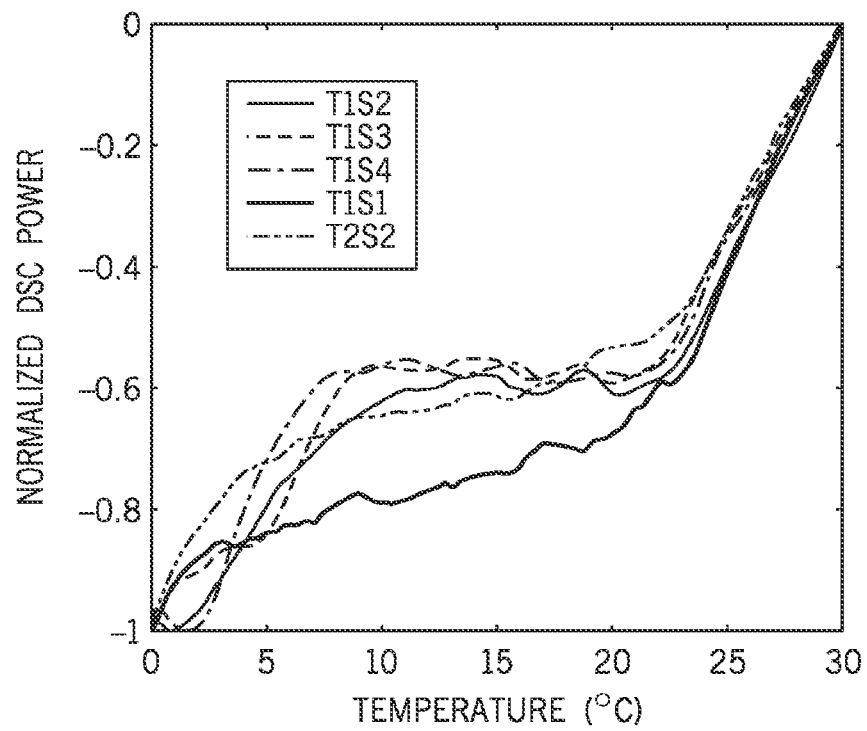
FIG. 14B is a graph showing DSC Power normalized to the full range of variation in each sample of FIG. 14A.

FIGS. 14A-14B shows a comparison of the normalized scattering changes (FIG. 14A) and normalized DSC power (FIG. 14B) across all the samples measured. The normalization allowed a comparison of samples with different baseline scattering coefficients and with different thermal masses, respectively. It may be noted that all sub-samples from the first tissue behaved similarly, both with regard to optical scattering and DSC specific heat, with some degree of variation as expected from a biological tissue. The second sub-samples of the second tissue also displayed an apparent transition around 10° C., and confirmed with DSC data, while the first subsample of the first tissue appeared to have a distinct behavior with the acceleration in the scattering increase and higher DSC power draw only showing an inflection closer to 4-5° C. This may be explained by the fact that the tissues are not uniform. Nevertheless, the two techniques remain in fairly good agreement.

Figure 15A:
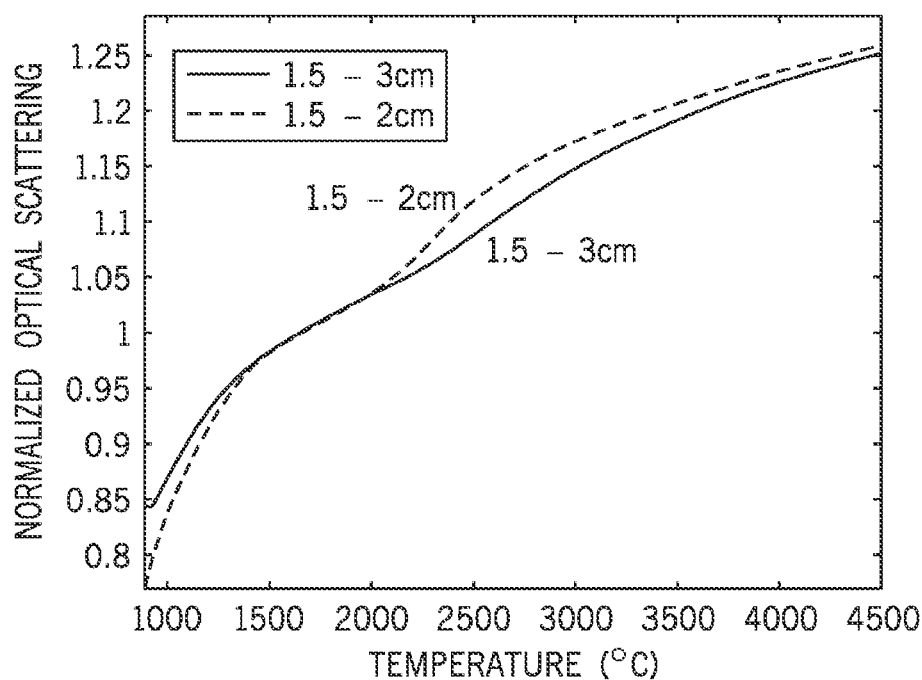
FIG. 15A is a graph showing normalized optical scattering measurements versus time at different depths using combinations of source-detector pairs, in accordance with aspects of the present disclosure.
Figure 15B:
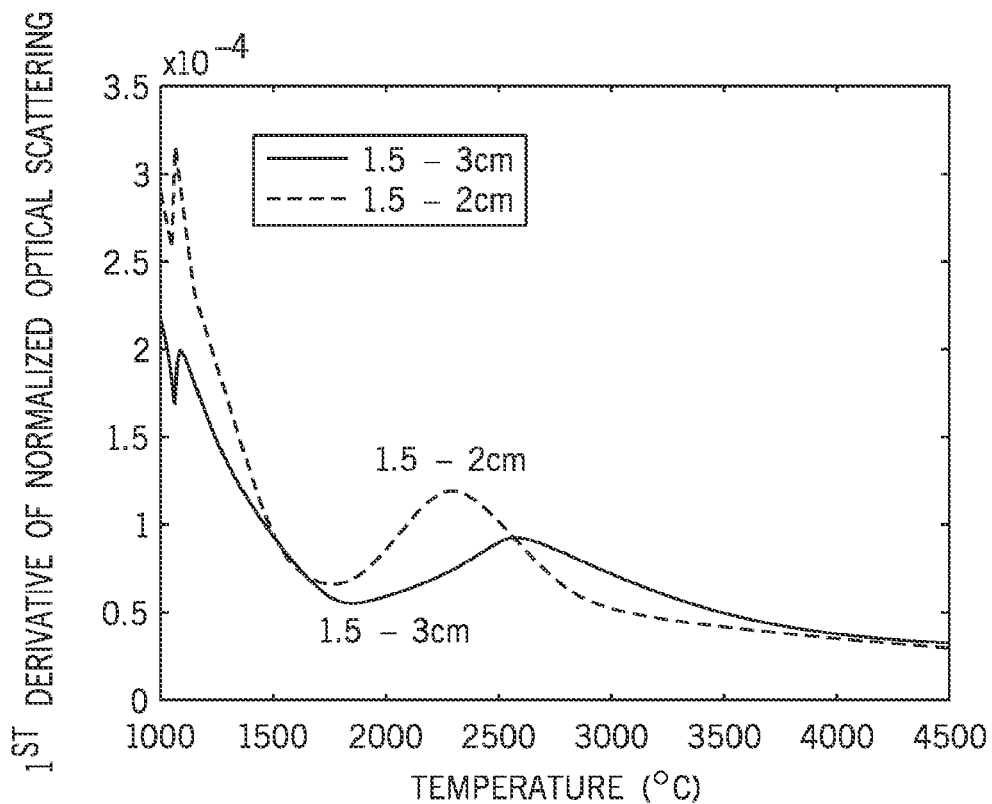
FIG. 15B is a graph showing the derivative of the normalized optical scattering measurements of FIG. 15A.

To quantify the onset of phase transition at different depths, the average OS computed from the first two source-detector distances (1-1.5 cm) was compared to the OS time course from the 4 distance data (1-2.5 cm separation), respectively. These were likely to be representative of tissue 4-7 mm under the probe and 8-12 mm under the probe, respectively. FIG. 15A shows the OS plots at these two depths, while FIG. 15B shows the first derivative. The OS data was smoothed to help identify changes in the relative change relationship of OS and temperature. The peak of the first derivative of the OS plots likely shows the middle of the phase transition region. The OS of the fat at 1-1.5 cm separation shows earlier transition compared to the deeper location (corresponding to 1-2.5 cm) in the tissue as expected from the cooling front progression from skin to the deeper fatty layer. As appreciated from the figures, the first derivative of the OS over time is one feature that can be used to determine the onset of the phase transition. Moreover, when different optode sets are chosen, the phase transition at different depths can be monitored (as shown in FIGS. 15A-15B). Although a simple analysis was used here, it is envisioned that more sophisticated layered models for light transport could be readily employed to potentially obtain finer spatial resolution.

Discussion

Overall, the results from both donor tissues show a remarkable level of agreement between optical scattering measurements and the gold-standard technique for monitoring phase transition processes, differential scanning calorimetry. Additionally, the T2* MR relaxation time, along with the OCT signal intensity and attenuation measurements further demonstrate inflexions in their relationship with temperature around 8-10° C. during cooling and 13-15° C. during heating. As shown, the exact transition points can vary slightly. This may be, for example, due to the slight mis-alignments between the location of the thermal probes, the NIRS sensitivity profile and the MR region of interest. This may also be due to sample spatial variation that impacts the behavior of any microscopic piece of tissue harvested vs the sample average.

Another significant agreement observed using methods applied herein included intrinsic sample property changes at temperatures that were several degrees higher during heating as compared to cooling. Such hysteresis was exhibited over multiple heating/cooling cycles by several samples. This could be due to formation of different polymorphs of the fat crystals between the cycles. For instance, the inflexions in the measured intrinsic/optical property versus temperature waveforms strongly suggest internal changes in the structure of the samples. In fact, OCT data showed that cell interiors become more opaque (i.e. higher scattering) below the transition temperature. This may be seen macroscopically as a change in the optical scattering coefficient measured with NIRS. In addition, the T2* transverse relaxation time depends on both the local microenvironment and molecular level interactions, against suggesting a change in the internal structure of the tissue. As appreciated, transition points may likely be related to the composition of the sub-cutaneous fat. Therefore, monitoring, in accordance with the present disclosure, may be needed during cryoprocedures to achieve planned outcomes.

Conclusion

Results herein show that kinetics of phase change due to cooling and heating can be monitored using NIRS. Scattering properties can be measured and correlated to the temperature and the phase change in fat tissue, and other biological material, can be predicted. Specifically, optical scattering changes with temperature can be used to obtain the phase transition points. Correlations may also be derived to predict targeted transition points. As shown, measured scattering/absorption properties during cooling/heating were correlated with kinetics of phase transition in adipose tissue. Scattering and absorption varied slightly between different subjects, possibly due to the amount of saturated vs. unsaturated fat or different polymorph of fat. Therefore, the present approach offers a non-invasive in vivo technique to monitor and optimize cryosurgery and cryolipolysis, as well as other processes and procedures. Optical monitoring could be easily integrated into treatment devices to monitor the onset of phase transition to enhance efficiency and treatment outcome. This technique can further be utilized in monitoring phase change in other surgical procedures such as those using high intensity focused ultrasound, shock waves, radio frequency ablation, IR radiation and laser ablation.

The present invention has been described in terms of one or more preferred embodiments, and it should be appreciated that many equivalents, alternatives, variations, and modifications, aside from those expressly stated, are possible and within the scope of the invention.

The invention claimed is:

1. A system for characterizing biological material, the system comprising:
   an optical system comprising a light source and a light detector, the light source configured to generate light signals and the light detector configured to detect the light signals; and
   a controller configured to:
      control the optical system to transmit light signals to the biological material and to detect light signals therefrom;
      conduct an analysis, using optical data corresponding to the light signals detected, to determine optical properties of the biological material;
      determine, using the optical properties, phase information of the biological material; and
      generate, using the phase information, a report characterizing the biological material.

2. The system of claim 1, wherein the light source generates the light signals in a near-infrared spectrum.

3. The system of claim 1, wherein the optical system is further configured to generate light signals in a continuous-wave mode, or a modulated wave mode, or both.

4. The system of claim 1, wherein the controller is further configured to conduct the analysis by applying a light transport model to optical data associated with the light signals detected.

5. The system of claim 4, wherein the controller is further configured to utilize image information obtained from the biological material in the analysis.

6. The system of claim 1, wherein the controller is further configured to utilize the phase information to generate one or more maps indicating at least one region in the biological material having a predetermined phase or a change in phase.

7. The system of claim 6, wherein the predetermined phase comprises a crystalline phase, an amorphous phase, a liquid phase, or a combination thereof.

8. The system of claim 1, wherein the controller is further configured to assemble, using the optical properties, at least one waveform indicating a time variation or a temperature variation of the optical properties.

9. The system of claim 8, wherein the controller is further configured to analyze the at least one waveform to determine a phase or a change in phase in at least one region of the biological material.

10. The system of claim 1, wherein the controller is further configured to analyze the phase information to characterize a treatment applied to the biological material or to generate information for adapting the treatment.

11. The system of claim 1, further comprising an optical coupling configured to engage a biological material and to transfer light signals between the optical system and the biological material.

12. A method for characterizing biological material, the method comprising:
    acquiring optical data associated with a biological material;
    analyzing the optical data to determine optical properties of the biological material;
    determining, using the optical properties, phase information of the biological material;
    generating a report characterizing the biological material using at least the phase information.

13. The method of claim 12, wherein the method further comprises acquiring the optical data by controlling an optical system to transmit light signals to the biological material and to detect light signals therefrom.

14. The method of claim 12, wherein method further comprises acquiring optical data associated with at least one of a fat tissue, a dermis, an epidermis, and a muscle.

15. The method of claim 12, wherein the method further comprises analyzing the optical data to determine absorption properties, scattering properties, or both, of the biological material.

16. The method of claim 12, wherein the method further comprises analyzing the optical data using a light transport model.

17. The method of claim 16, wherein the method further comprises utilizing image information obtained from the biological material in the analysis.

18. The method of claim 12, wherein the method further comprises generating one or more maps indicating at least one region in the biological material having a predetermined phase or a change in phase.

19. The method of claim 18, wherein the predetermined phase comprises a crystalline phase, an amorphous phase, a liquid phase, or a combination thereof.

20. The method of claim 12, wherein the method further comprises assembling, using the optical properties, at least one waveform indicating a time variation or a temperature variation of the optical properties.

21. The method of claim 20, wherein the method further comprises identifying at least one feature in the at least one waveform to determine a phase or a change in phase in at least one region of the biological material.

22. The method of claim 20, wherein the method further comprises analyzing the phase information to characterize a treatment applied to the biological material or to generate information for adapting the treatment.

* * * * *